United States Patent
Koch et al.

(10) Patent No.: US 12,225,857 B2
(45) Date of Patent: *Feb. 18, 2025

(54) AIR SYSTEM

(71) Applicant: Sukup Manufacturing Co., Sheffield, IA (US)

(72) Inventors: Matthew Koch, Clear Lake, IA (US); Matthew Koenen Koehler, Meservey, IA (US); Daniel Wayne Shrock, Raymondville, MO (US)

(73) Assignee: Sukup Manufacturing Co., Sheffield, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,474

(22) Filed: Oct. 25, 2023

(65) Prior Publication Data

US 2024/0074358 A1    Mar. 7, 2024

Related U.S. Application Data

(63) Continuation of application No. 16/721,147, filed on Dec. 19, 2019, now Pat. No. 11,839,181.

(60) Provisional application No. 62/781,718, filed on Dec. 19, 2018.

(51) Int. Cl.
*A01F 25/22*    (2006.01)
*F26B 25/00*    (2006.01)

(52) U.S. Cl.
CPC ............ *A01F 25/22* (2013.01); *F26B 25/009* (2013.01); *F26B 2200/06* (2013.01)

(58) Field of Classification Search
CPC ...... F26B 25/009; F26B 2200/06; F26B 3/06; F26B 9/063; A01F 25/22; Y02P 70/10
See application file for complete search history.

(56) References Cited

U.S. PATENT DOCUMENTS 8,920,078 B2 * 12/2014 Woolever ............... B65G 53/66
                                                          406/14
11,839,181 B2 * 12/2023 Koch ...................... A01F 25/22

FOREIGN PATENT DOCUMENTS

CN          2811232 Y  *  8/2006

OTHER PUBLICATIONS

Translation, CN-2811232-Y (Year: 2006).*

* cited by examiner

*Primary Examiner* — Jessica Yuen
(74) *Attorney, Agent, or Firm* — Christopher A. Proskey; BrownWinick Law Firm

(57) ABSTRACT

A grain handling system having an air system is presented that is capable of automatically detecting and clearing a plug in a tube of an air system using a central controller, an air pressure sensor, a dynamic pressure relief valve and a variable frequency drive connected to and controlling a blower motor. When a plug is detected, the central controller stops the flow of grain into the tube and ramps up the output of the blower motor to full capacity. Thereafter, the central controller performs an unplugging routine by opening and closing the dynamic pressure relief valve causing surges of air to impact the plug either breaking up the plug or bumping the plug along the tube until it clears. Once the plug clears, the central controller resumes normal operation.

25 Claims, 16 Drawing Sheets

Typical Automated Operation Sequence:

| Air System senses Air Pressure and Motor Current Depending on Auto Control Type: |
|---|
| Pressure Control (VFD Motor Speed Control): Air System Senses pressure and controls the pressure by changing the speed of the motor up and down to maintain desired pressure. The Air Bleed Valve is closed in this mode. |
| Current Control (VFD Motor Speed Control): Air System Senses current draw of the motor and speeds up or slows down the motor to maintain desired current draw. The Air Bleed Valve is closed in this mode. |
| Pressure Control (Air Bleed Valve Control EMOV): Air System Senses pressure and controls the pressure by opening or closing the Air Bleed Valve Control to speed up or slow down the grain velocity in the pipe. In this mode the Motor is run at max speed. |
| Pressure Control (Air Bleed Valve Control EMOV): Air System Senses current draw and controls the current by opening or closing the Air Bleed Valve Control to speed up or slow down the grain velocity in the pipe. In this mode the Motor is run at Max speed. |
| Hybrid Pressure Control (VFD Motor Speed Control EMOV Dominant): Air System Senses pressure and sets the Air Bleed Valve open a desired amount and then changes the speed of the motor to maintain desired pressure. |
| Hybrid Pressure Control (Air Bleed Valve Control EMOV Dominant): Air System Senses pressure and sets the Motor speed to a desired amount and then changes the position of the Air Bleed Valve Control to maintain desired pressure. |
| Hybrid Pressure Control (VFD Motor Speed Control EMOV Dominant): Air System Senses current and sets the Air Bleed Valve open a desired amount and then changes the speed of the motor to maintain desired current. |
| Hybrid Pressure Control (Air Bleed Valve Control EMOV Dominant): Air System Senses current and sets the Motor speed to a desired amount and then changes the position of the Air Bleed Valve Control to maintain desired current. |
| Hybrid Pressure/Current Control (VFD Motor Speed Control EMOV Dominant): Air System Senses pressure and current and sets the Air Bleed Valve open a desired amount and then changes the speed of the motor to maintain desired pressure and current. |
| Hybrid Pressure/Current Control (Air Bleed Valve Control EMOV Dominant): Air System Senses pressure and current and sets the Motor speed a desired amount and then changes the positon of the Air Bleed Valve Control to maintain desired pressure and current. |

FIG. 11B

AIR SYSTEM AUTOMATED UNPLUGGING:

- Air System senses the pressure above a preset set-point.
- It instructs the Dryer PLC that it is no longer ready for grain.
- The Dryer PLC turns off its unload system and waits.
- The Air System fully opens the Air Bleed Valve.
- The Air System starts the blower and adjusts the speed.
- The Air System coordinates between the blower speed and the bleed valve position to remove the grain blockage in the Air System piping. It does this by monitoring pressure and motor amperage to ensure that it doesn't trip a motor overload while cleaning out the grain.
- The Dryer then resumes the Unload System and starts unload again, but at a lower discharge rate. This is accomplished because the Air System tells the Dryer that it was overloaded and asks the dryer to reduce its maximum discharge limit so that it doesn't plug the Air System again.

FIG. 12B

AIR SYSTEM

CROSS REFERENCE TO RELATED APPLICATIONS

This utility patent application is a continuation of U.S. Utility patent application Ser. No. 16/721,147 entitled "Air System" and filed Dec. 19, 2019, which claims priority to U.S. Provisional Patent Application No. 62/781,718 filed on Dec. 19, 2018, entitled "Air System", each of which is fully incorporated by reference herein.

FIELD OF THE ART

This disclosure relates to the material handling arts. More specifically, and without limitation, this disclosure relates to grain handling arts.

BACKGROUND

Since the development of harvesting technology that is capable of separating the desired grains from the surrounding chaff, new technologies have been developed to handle bulk quantities of grain. That is, new technologies have been developed to store bulk grain, such as grain bins; new technologies have been developed to dry grain, such as grain dryers; and new technologies have been developed to move grain, such as bucket elevators, drag chains, belt systems and air systems, to name a few.

One common form of a grain handling system is known as an air system. Air systems are used to move grain from a source of grain to a storage device or other device by flowing pressurized air through a tube while grain is also injected into the tube.

Air systems have many advantages. That is, air systems are relatively inexpensive. Air systems have relatively few moving parts. Air systems can be used to transport grain to a number of storage devices in a relatively easy manner. Air systems are highly adaptable and can be used in a great variety of applications. Air systems are relatively easy to install and maintain. These are only a few of the many other advantages to using air systems to transport grain.

While air systems have many advantages, air systems suffer from a number of challenges. That is, as air systems are dependent upon flowing air to move grain through a tube, changes in the air, such as temperature, humidity, barometric pressure, and the like can affect the performance of an air system. In addition, air systems are sensitive to changes in the grain flowing through the tube, such as changes in weight, changes in size, changes in moisture content, changes in debris or fines content, and the like, which can affect the operation of an air system. In addition, air systems are sensitive to the speed at which grain is added to the air system, among countless other variables.

This sensitivity means that an air system that is optimally performing one moment can be woefully out of tune and prone to plugging shortly thereafter. As such, existing air systems require constant manual oversight to ensure they are operating properly otherwise they can damage the grain by moving it too fast through the tubing or alternatively the air system can plug.

When an air system plugs, this is a significant problem. When an air system plugs the air system requires immediate attention and immediate actions must be taken otherwise parts can break and/or the plug can get irreparably worse. Namely, when a plug is detected, the flow of grain into the tube must be immediately stopped, otherwise the added grain will make the plug worse. In addition, when a plug is detected precautionary measures must be taken to ensure the blower motor and/or other components do not overload and burn out. When a plug occurs in an air system, manual maintenance is required to clear the plug before normal operation of the grain handling system can resume. This is obviously undesirable and time consuming, especially during the pressure of harvest time.

Therefore, for all the reasons stated above, and the reasons stated below, there is a need in the art for an improved air system.

Thus, it is an object of at least one embodiment to provide an air system and method of control that improves upon the state of the art.

Another object of at least one embodiment is to provide an air system and method of control that reduces plugging of the air system.

Yet another object of at least one embodiment is to provide an air system and method of control that automatically detects plugging of the air system.

Another object of at least one embodiment is to provide an air system and method of control that automatically clears plugs in the air system.

Yet another object of at least one embodiment is to provide an air system and method of control that automatically detects plugs in the air system.

Another object of at least one embodiment is to provide an air system and method of control that automatically shuts down the flow of grain into the air system when a plug is detected.

Yet another object of at least one embodiment is to provide an air system and method of control that minimizes a plug in the air system when the plug is detected.

Another object of at least one embodiment is to provide an air system and method of control that is capable of clearing a plug and resuming normal operation automatically and without manual intervention.

Yet another object of at least one embodiment is to provide an air system and method of control that that is more robust than existing air systems.

Another object of at least one embodiment is to provide an air system and method of control that that reduces the cost of operating air systems.

Yet another object of at least one embodiment is to provide an air system and method of control that that reduces the labor related to operating air systems Another object of at least one embodiment is to provide an air system and method of control that that makes air systems more desirable.

Yet another object of at least one embodiment is to provide an air system and method of control that that optimally controls operation of the air system.

Another object of at least one embodiment is to provide an air system and method of control that reduces the potential for catastrophic occurrences.

Yet another object of at least one embodiment is to provide an air system and method of control that that increases the up-time of air systems.

Another object of at least one embodiment is to provide an air system and method of control that reduces the down-time of air systems.

Yet another object of at least one embodiment is to provide an air system and method of control that provides new functionality for air systems Another object of at least one embodiment is to provide an air system and method of control that improves the safety of using air systems.

Yet another object of at least one embodiment is to provide an air system and method of control that is easy to use.

Another object of at least one embodiment is to provide an air system and method of control that has a robust design.

Yet another object of at least one embodiment is to provide an air system and method of control that works effectively.

Another object of at least one embodiment is to provide an air system and method of control that saves time.

Yet another object of at least one embodiment is to provide an air system and method of control that is efficient to use.

Another object of at least one embodiment is to provide an air system and method of control that has a long useful life.

Yet another object of at least one embodiment is to provide an air system and method of control that protects the quality of the grain.

Another object of at least one embodiment is to provide an air system and method of control that is durable.

Yet another object of at least one embodiment is to provide an air system and method of control that is relatively inexpensive.

Another object of at least one embodiment is to provide an air system and method of control that is high quality.

Yet another object of at least one embodiment is to provide an air system and method of control that can be used with practically any grain handling system.

Another object of at least one embodiment is to provide an air system and method of control that makes it easier to handle grain.

These and other objects, features, or advantages of at least one embodiment will become apparent from the specification, figures and claims.

SUMMARY

A grain handling system having an air system is presented that is capable of automatically detecting and clearing a plug in a tube of an air system using a central controller, an air pressure sensor, a dynamic pressure relief valve and a variable frequency drive connected to and controlling a blower motor. When a plug is detected, the central controller stops the flow of grain into the tube and ramps up the output of the blower motor to full capacity. Thereafter, the central controller performs an unplugging routine by opening and closing the dynamic pressure relief valve causing surges of air to impact the plug either breaking up the plug or bumping the plug along the tube until it clears. Once the plug clears, the central controller resumes normal operation.

BRIEF DESCRIPTION OF THE DRAWINGS

FIG. 11B is a sequence of steps of a typical automated operation sequence of the grain handling system having a central controller, a grain dryer and an air system, the view showing variations of the configuration of the system and how they may be controlled;

FIG. 12B is a sequence of steps of a typical automated unplugging operation and sequence of the grain handling system having a central controller, a grain dryer and an air system, an dynamic pressure relief valve, and a variable frequency drive, the view also showing steps for setting grain dryer unload air system maximum operation interlock;

DETAILED DESCRIPTION

Figure 1:
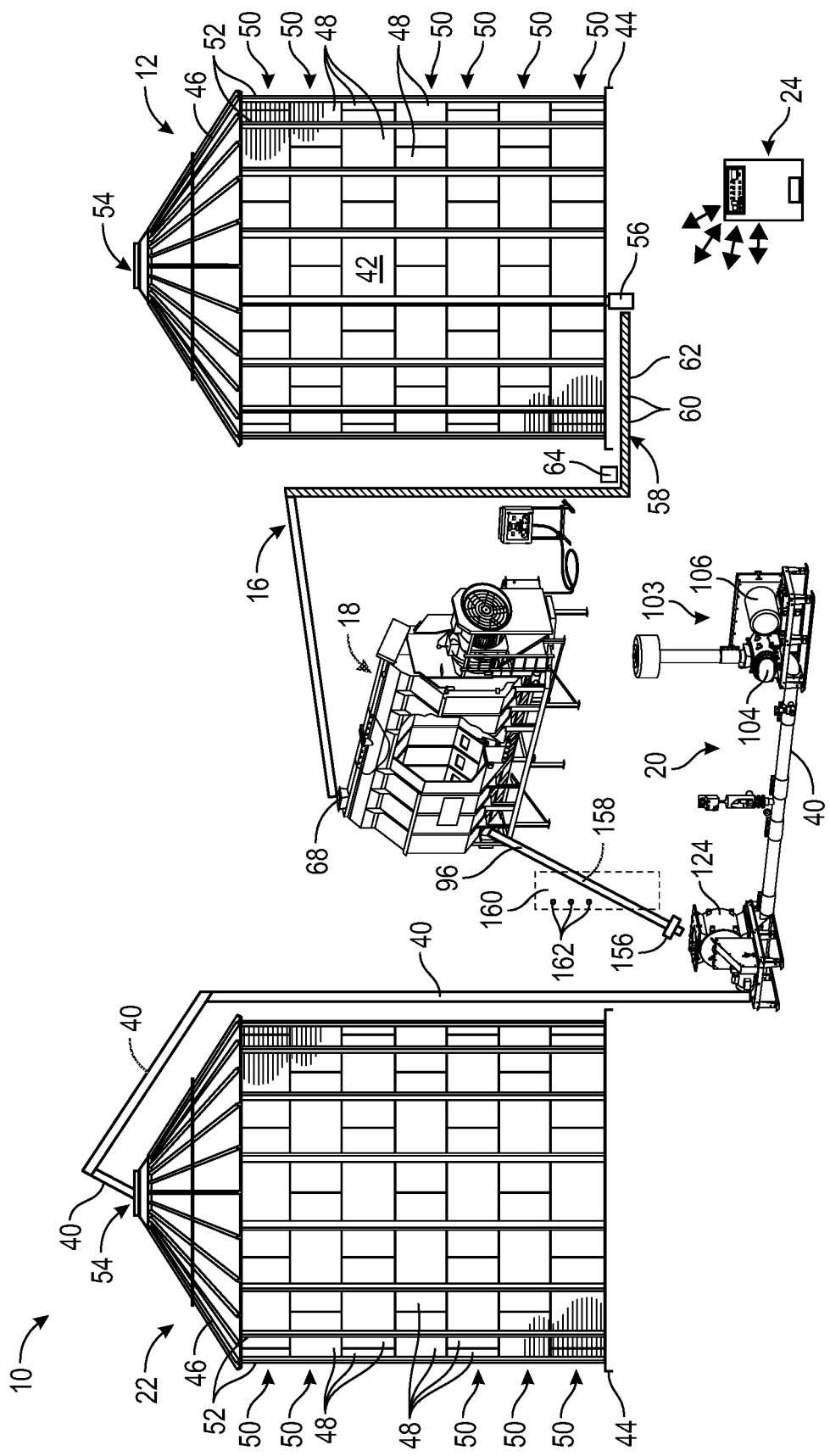
FIG. 1 is a plan view of a grain handling system having a wet bin, an input device, a grain dryer, an air system and a dry bin.

In the following detailed description, reference is made to the accompanying drawings which form a part hereof, and in which is shown by way of illustration specific embodiments in which various embodiments of the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure. The following detailed description is, therefore, not to be taken in a limiting sense, and the scope is defined only by the appended claims, along with the full scope of equivalents to which such claims are entitled.

As used herein, the terminology such as vertical, horizontal, top, bottom, front, back, end, sides, left, right, and the like are referenced according to the views, pieces, parts, components and figures presented. It should be understood, however, that the terms are used only for purposes of description, and are not intended to be used as limitations. Accordingly, orientation of an object or a combination of objects may change without departing from the scope of the disclosure.

System:

With reference to the figures, a grain handling system 10 (or system 10) is presented. The grain handling system 10 is shown in use with a wet grain bin 12 that stores grain 14 (wet grain), an input device 16, a grain dryer 18, an air system 20, a dry grain bin 22 that receives grain 14 (dry grain) and a central controller 24 that is connected through the internet 26, the cloud 28 and/or a wired and/or a wireless network 30 to a user's electronic device 32 such as a computer 34, a cell phone 36 and/or a tablet 38 among other parts and components described further herein.

In the example shown in FIG. 1, grain handling system 10 is shown and described in what is known as a drying operation which is often performed at or around the time of harvest where grain 14 is harvested with a moisture content that is higher than what is acceptable for long term storage. This wet grain 14 then must be dried before it can be stored for extended periods of time without spoilage. In this example, of FIG. 1, when harvested, wet grain 14 is stored in wet grain bin 12 while it waits to be dried using grain dryer 18. This wet grain 14 is transported out of wet grain bin 12 through input device 16 and into grain dryer 18. The wet grain 14 passes through grain dryer 18 while being exposed to heat and air movement which reduces the moisture content of the grain 14 to an acceptable level for long term storage. This dry grain 14 exits the dryer 18 and moves through tube 40 by air movement forced through tube 40 by air system 20. This dry grain 14 is then deposited in dry grain bin 22 where it may be stored for extended periods of time without spoilage.

This example of a drying operation is only that, an example. This drying operation is only one of countless ways that grain handling system 10 and air system 20 may be used to store, move, dry, mix, deliver and otherwise handle grain 14. As such, description of grain handling system 10 and air system 20 in association with a drying operation is not meant to be limiting. Instead, description of grain handling system 10 and air system 20 in association with a drying operation is only intended to serve as one way of describing how the grain handling system 10 and air system 20 operate. It is hereby contemplated that the teachings of this disclosure are intended to apply to all ways in which grain handling system 10 and air system 20 may be used to handle grain 14.

In addition, while the grain handling system 10 and air system 20 are described herein in association with the handling of grain 14, grain handling system 10 and air system 20 is not limited to use with grain 14. Instead, it is hereby contemplated that grain handling system 10 and air system 20 may be used with any flowable material and/or particulate material without limitation. Description of the use of grain handling system 10 and air system 20 in association with grain 14 is only one of countless examples of use.

Wet Grain Bin:

In the arrangement shown, as one example, grain handling system 10 is used in association with what is known as a wet grain bin 12. Wet grain bin 14 is formed of any suitable size, shape and design and is configured to store bulk wet grain 14 that is to be dried using grain dryer 18. In the arrangement shown, as one example, wet grain bin 12 is a large, generally cylindrical structure that has a curved sidewall 42. Sidewall 42 connects at its lower end to a foundation 44. Sidewall 42 connects at its upper end to a peaked roof 46.

Sidewall 42 of wet grain bin 12 is formed of any suitable size, shape and design. In one arrangement, as is shown, sidewall 42 is formed of a plurality of sheets 48 of material that are connected to one another in overlapping edge-to-edge alignment. In the arrangement shown, these sheets 48 are assembled in rings 50 that are stacked on top of one another between foundation 44 and roof 46. In the arrangement shown, as one example, to provide additional strength and rigidity, sheets 48 of sidewall 42 include corrugated undulations therein. Also, in the arrangement shown, as one example, the exterior surface of sidewall 42 include stiffeners 52 that extend from foundation 44 to roof 46 which provide further structural rigidity to wet grain bin 12.

In the arrangement shown, as one example, wet grain bin 12 includes an opening 54 at the approximate center of roof 46 through which grain 14 is added to wet grain bin 12. In the arrangement shown, as one example, wet grain bin 12 includes an opening 56 at its lower end through which grain 14 is removed from wet grain bin 12.

Wet grain bin 12 serves as a source of grain 14 for grain handling system 10, grain dryer 18 and air system 20. While wet gain bin 12 is shown and described, any other storage device is hereby contemplated for use as a source of grain 14 for system 10 such as a silo, a pit, or any other form of a grain storage device or system.

In the arrangement shown, as one example, grain 14 is removed from wet grain bin 12 through opening 56 input device 16 which delivers grain 14 to grain dryer 18.

Dry Grain Bin:

In the arrangement shown, as one example, grain handling system 10 is used in association with dry grain bin 22. The disclosure provided herein with respect to wet grain bin 12 applies to dry grain bin 22. As such for purposes of brevity, unless stated otherwise, disclosure related to wet grain bin 12 is equally applicable to dry grain bin 22.

In the arrangement shown, as one example, grain 14 is received through opening 54 at the upper end of dry grain bin 22 from tube 40 by way of air pressure and air flow from air system 20.

Input Device:

In the arrangement shown, as one example, grain handling system 10 is used in association with input device 16. Input device 16 is formed of any suitable size, shape and design and is configured to move grain 14 from wet grain bin 12 to grain dryer 18. In the arrangement shown, as one example, input device 16 connects to opening 56 in the lower end of wet grain bin 12 and drains grain 14 out of wet grain bin 12.

In the arrangement shown, as one example, input device 16 is formed of an auger 58 having helical fighting 60 that rotate within a cylindrical shield 62 under the power of motor 64. In one arrangement, auger 58 connects to a sump positioned in the floor of the wet grain bin 12 which is covered by a gate. When the gate is opened and the auger 58 is operated by motor 64 such that helical flighting 60 rotates within shield 62 grain 14 is carried out of wet grain bin 12 through input device 16 to grain dryer 18.

While an auger 58 system is shown in use as input device 16, any other manner, method or means or apparatus is hereby contemplated for use to convey wet grain 14 from wet grain bin 12, or another source of grain 14, to grain dryer 18.

Grain Dryer:

In the arrangement shown, as one example, grain handling system 10 is used in association with a grain dryer 18. Grain dryer 18 is formed of any suitable size, shape and design and is configured to reduce the moisture content of grain 14. In the arrangement shown, as one example, grain dryer 18 is what is known as a continuous flow grain dryer 18 or a cross-flow grain dryer. However any other form of a grain dryer 18 is hereby contemplated for use.

Continuous flow grain dryer 18 operates by receiving wet grain 14 at a top side. This wet grain 14 travels by the force of gravity downward through the grain dryer 18 as it is conditioned by air blowing through the grain 14. By the time the grain 14 reaches the bottom side of the grain dryer 18 the grain 14 has been dried to the desire moisture content. This dried grain 14 is discharged at a bottom side of the grain dryer 18.

In the arrangement shown, as one example, grain dryer 18 includes an input 66 at its top side that is configured to receive wet grain 14 from the output end of input device 16. This wet grain 14 is then distributed evenly across grain dryer 18 by loading system 68. In the arrangement shown, as one example, loading system 68 is formed of an auger system that dispenses grain 14 across the top side of the grain dryer 18. However any other grain moving device or system is hereby contemplated for use as loading system 68.

In the arrangement shown, as one example, wet grain 14 loaded into grain dryer 18 travels downward on either side of the loading system 68 under the force of gravity between an interior wall 70 and an exterior wall 72. The space between the interior wall 70 and the exterior wall 72 is known as the grain column 74. Interior wall 70 and exterior wall 72 are perforated so as to allow air to flow through the interior wall 70 and the exterior wall 72 while retaining the grain 14 within the grain column 74. These perforations in interior wall 70 and exterior wall 72 allow air to pass through the grain. These perforations in interior wall 70 and exterior wall 72 also allow fines to pass through the interior wall 70 and exterior wall 72 which can accumulate on the exterior surface of the exterior wall 72 when air is being blown outward through the grain column 74 and which can accumulate on the interior surface and/or within the plenum 76 when air is sucked through the grain column 74 and into plenum 76.

In the arrangement shown, as one example, plenum 76 is formed between the interior surfaces of opposing interior walls 70. In the arrangement shown, as one example, plenum 76 is the hollow interior within grain dryer 18. Plenum 76 facilitates air movement through the grain columns 74.

Figure 2:
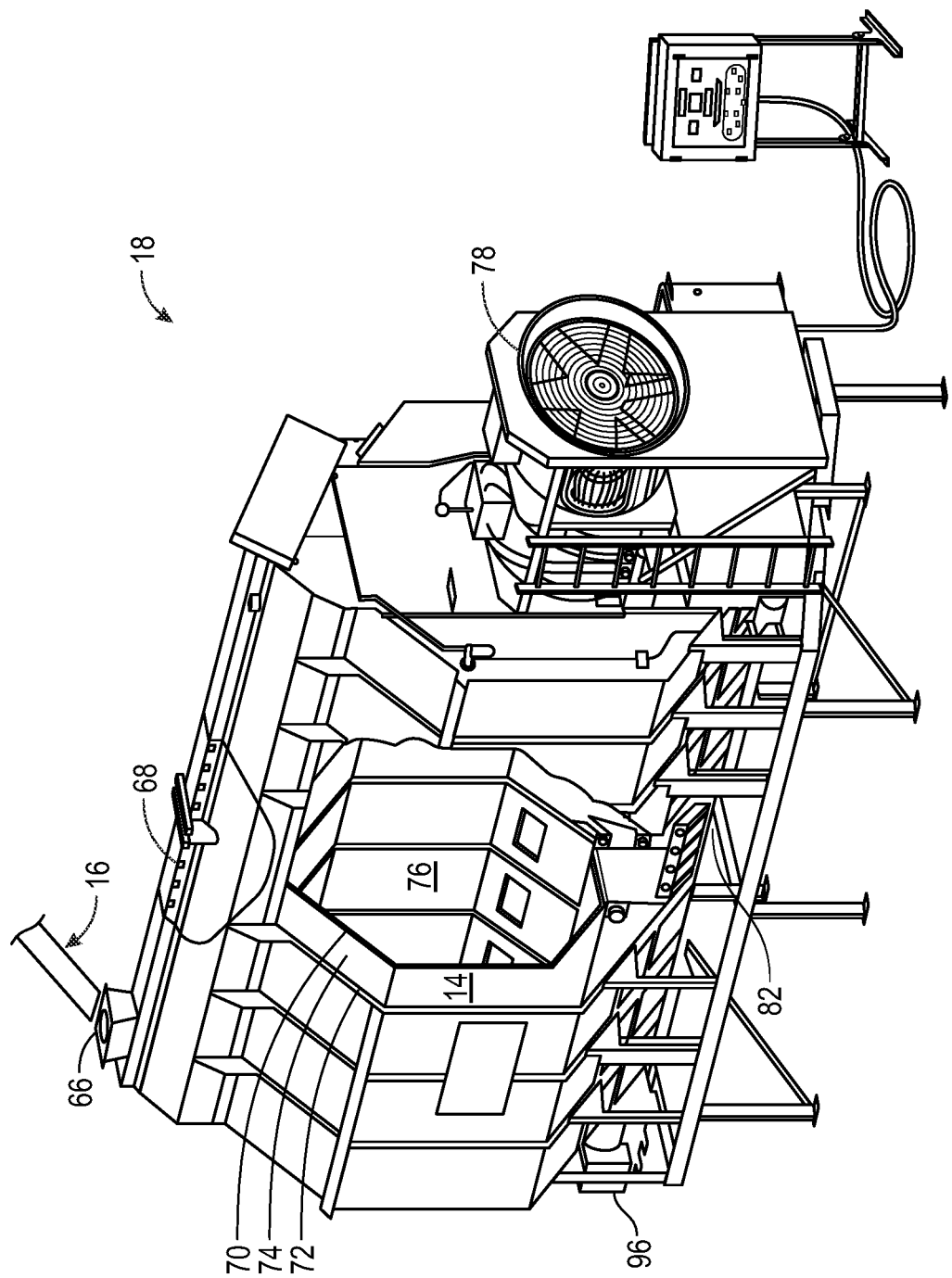
FIG. 2 is a close up perspective cut-away view of the grain dryer of FIG. 1, the view showing added details of the grain dryer.

In the arrangement shown as one example in FIGS. 1 and 2, grain dryer 18 is a heat only grain dryer. That is, the plenum 76 is a single, continuous and undivided space within grain dryer 18 that receives heated air blown into plenum 76 from the heater and fan system 78. This heated air then passes outward through the perforated interior wall 70, through the grain 14 within grain column 74, and out the perforated exterior wall 72. In this way, grain 14 within grain column 74 is heated and moisture is expelled from the grain 14 thereby drying the grain 14.

In an alternative arrangement, plenum 76 is divided into a heat section and a cool section by a divider. In one arrangement the heater and fan system 78 is positioned at or in the divider between the heat section and cool section such that air is blown from the cool section into the heat section. That is, the heat section of plenum 76 is pressurized and receives heated air from heater and fan system 78 that is blown outward through the perforated interior wall 70, through the grain 14 within grain column 74, and out the perforated exterior wall 72. In contrast, the cool section is under vacuum and receives air that is sucked inward through the perforated exterior wall 72, through the grain 14 within the grain column 74, and through the perforated interior wall 70 into the cool section of plenum 76. The addition of a cool section provides the benefit of sucking air into the plenum 76 through heated grain 14 in the grain column 74. This provides the benefit of heating or preheating the air by pulling it through the heated grain 14 in the grain column 74. This is also known as preserving this heat or recycling this heat or conservation of energy. This conservation of energy provides energy savings as the air is heated somewhat as it is pulled into the plenum 76. Then, this pre-heated air is heated further through the burner of the heater and fan system 78. But, due to the pre-heating of the air, the heater and fan system 78 does not have to raise the temperature of this air as far as it otherwise would without the pre-heating thereby providing energy savings.

When grain 14 reaches the end of grain column 74 it is metered out of grain column 74 by metering system 80.

Metering System: Metering system 80 is formed of any suitable size, shape and design and is configured to meter grain 14 out of the grain column 74 at adjustable desired rates. In the arrangement shown, as one example, metering system 80 is positioned at, adjacent or near the lower end of grain column 74. That is, in the arrangement shown, metering system 80 is positioned at, adjacent or near the lower end of interior wall 70 and the lower end of exterior wall 72 and is configured to meter grain 14 out of grain column 74. The grain 14 metered out of grain column 74 falls by the force of gravity into the discharge system 82.

In the arrangement shown, as one example, metering system 80 is formed of an interior metering roll 84 positioned at, adjacent or near the lower end of interior wall 70 and an exterior metering roll 86 positioned at, adjacent or near the lower end of exterior wall 72. However, any number of metering rolls are hereby contemplated for use, such as one, two, three, four, five or more.

In the arrangement shown, as one example, with an interior metering roll 84 positioned adjacent the interior wall 70 and a exterior metering roll 86 positioned adjacent the exterior wall 72 this provides the benefit of metering out different portions of the grain column 74 at different rates or speeds or amounts. That is, due to heated air being blown outward from plenum 76, the grain 14 within grain column 74 adjacent interior wall 70 tends to heat faster, and dry quicker, as it is closer to the heat source. In contrast, the grain 14 within grain column 74 adjacent exterior wall 72 tends to heat slower, and take longer to dry, as it is further from the heat source.

By having an interior metering roll 84 and an exterior metering roll 86 this allows for grain 14 within different portions of the grain column 74 to be metered at different rates as well as being discharged at different positions. That is, the interior metering roll 84 may be operated to dispense the grain 14 that is heated the fastest at a higher metering rate so as to not over-dry the grain 14 in the interior portion of the grain column 74. In contrast, the exterior metering roll 86 may be operated to dispense the grain 14 that is heated slower at a lower metering rate so as to allow this grain 14 adequate time within the grain column 74 to sufficiently dry. In addition, in one arrangement the interior metering roll 84 is positioned slightly above the exterior metering roll 86. By placing the interior metering roll 84 above the exterior metering roll 86 this allows for grain 14 adjacent the interior wall 70 to be discharged sooner than grain 14 adjacent the exterior wall 72. As such, providing an interior metering roll 84 and an exterior metering roll 86 in the grain column 74 allows for more precise control of the grain drying process and provides more even drying results.

To properly guide grain toward the interior metering roll 84 and the exterior metering roll 86, an interior guide 88 and an exterior guide 90 are positioned within grain column 74. Interior guide 88 and exterior guide 90 are formed of any suitable size, shape and design. In the arrangement shown, as one example, interior guide 88 angles from the interior wall 70 to interior metering roll 84 and exterior guide 90 angles from a mid-region of grain column 74 to exterior metering roll 86. In this way, interior guide 88 and exterior guide 90 separate grain column 74 into two streams of grain, an interior stream and an exterior stream. These independent interior stream and exterior stream of grain 14 are independently metered by interior metering roll 84 and exterior metering roll 86.

In an alternative arrangement, only a single metering roll is used.

Interior metering roll 84 and exterior metering roll 86 are formed of any suitable size, shape and design and serve to meter grain out of grain column 74. In the arrangement shown, interior metering roll 84 and exterior metering roll 86 are formed of approximately the same size, shape and design and include an elongated axle 92 with a plurality of flights 94 that are connected to axle 92 that extend along all or a portion of the length of axle 92. In the arrangement shown, as one example, four flights 94 are connected to axle 92 and extend outward from axle 92. However any number of flights 94 is hereby contemplated for use. Axle 92 serves as the axis of rotation of interior metering roll 84 and exterior metering roll 86 and as the axle 92 rotates each flight 94 dispenses an amount of grain from the grain column 74 that falls by the force of gravity into the discharge system 82.

Figure 3:
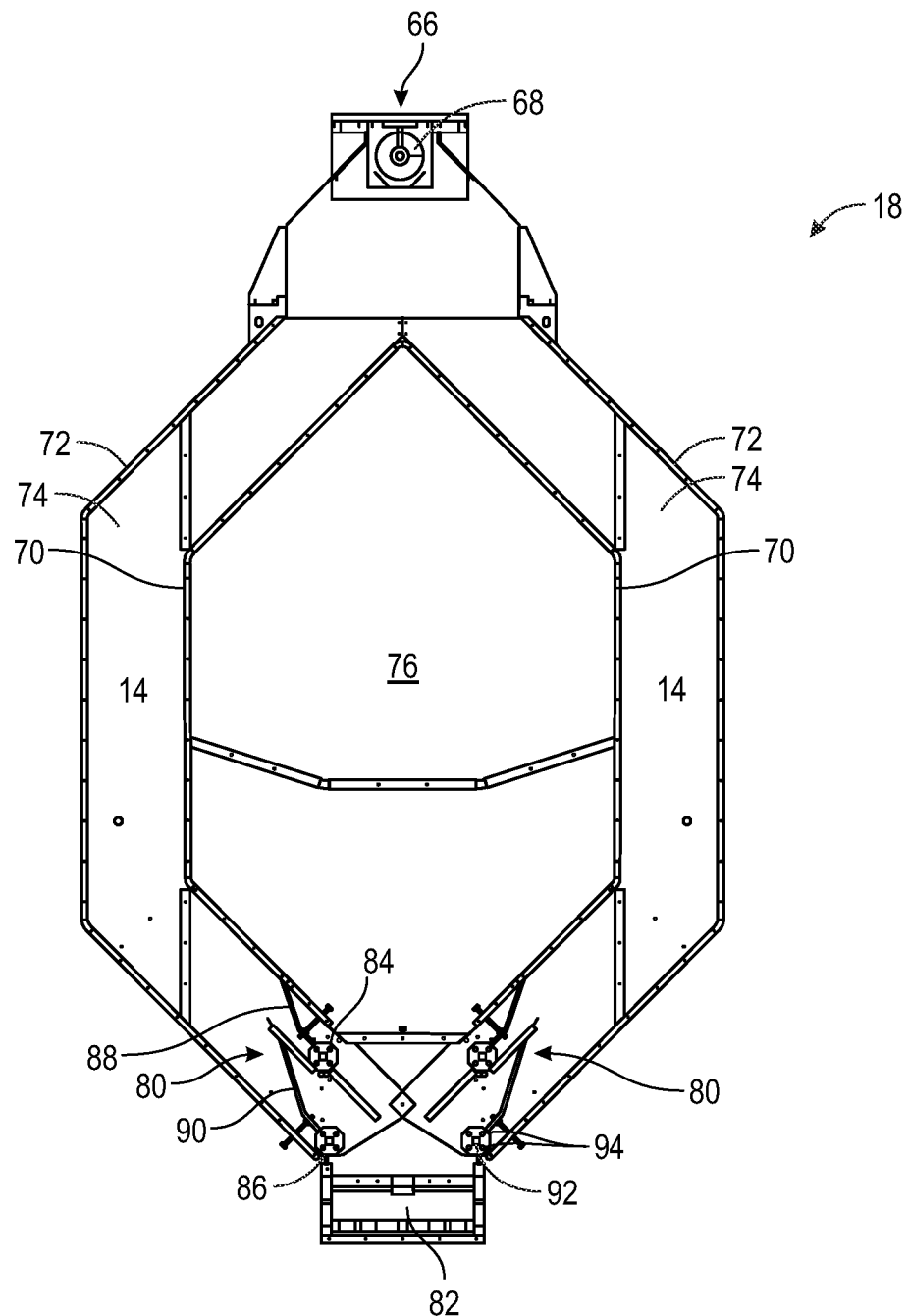
FIG. 3 is an elevation section view of the end of a gain dryer similar to that shown in FIGS. 1 and 2, the view showing added details of the grain dryer.
Figure 4:
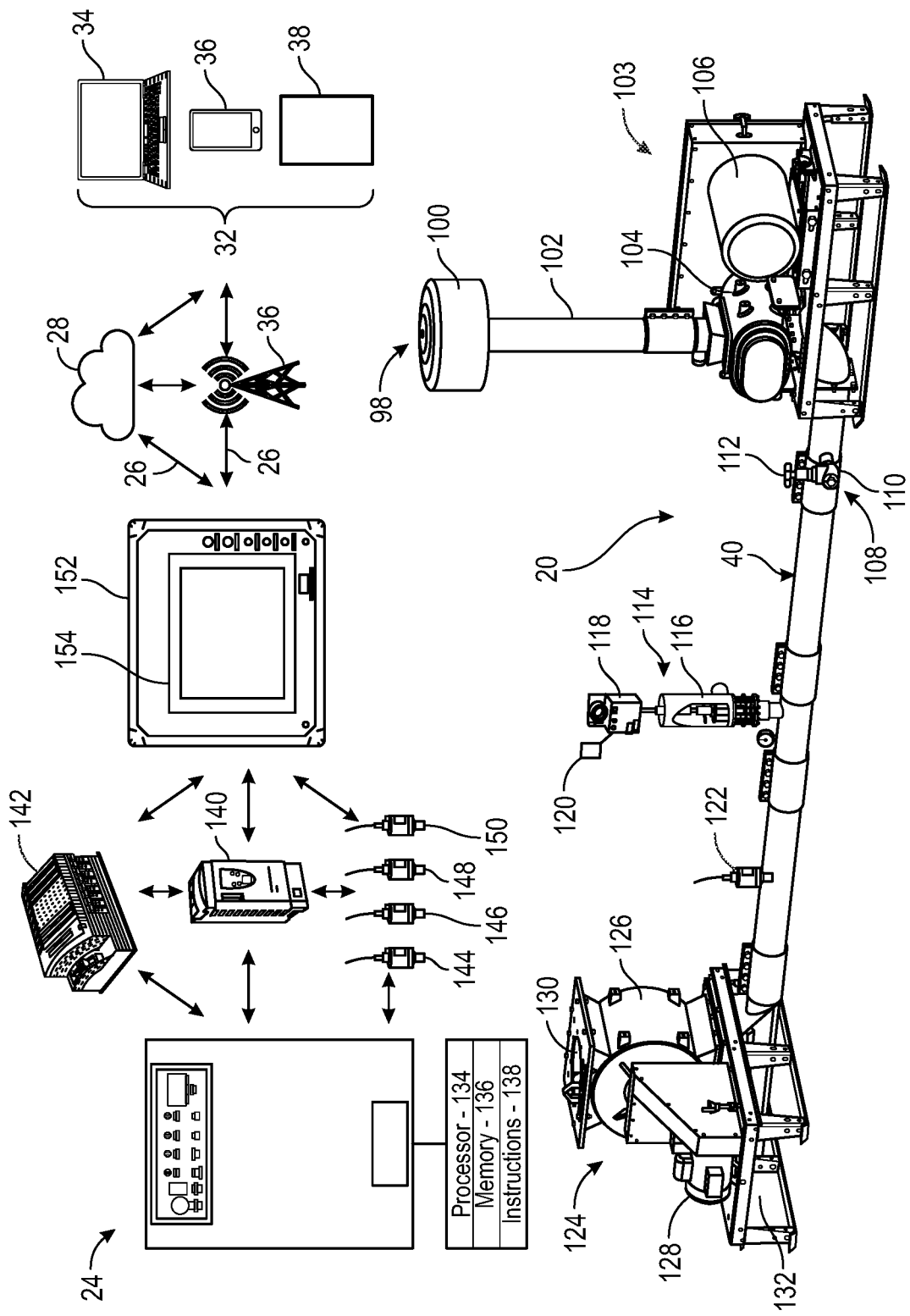
FIG. 4 is a close up plan view of the air system of FIG. 1 used in association with the central controller and other components of the system.

Discharge System: Discharge system 82 is formed of any suitable size, shape and design and is configured to discharge grain 14 metered out of grain column 74 by metering system 80 out of the grain dryer 18. In the arrangement shown, as one example, in FIG. 2, discharge system 82 is an auger system. In another arrangement, as another example, in FIG. 3, discharge system 82 is what is known as a drag unload or a drag chain. However any other form of an unload system is hereby contemplated for use as discharge system 82 such as a belt, an auger, or the like.

Discharge system 82 carries grain 14 to an outlet 96 at which point grain 14 discharged from grain dryer 18 is conveyed to air system 20 for transport to dry grain bin 22.

Air System:

In the arrangement shown, as one example, system 10 is used in association with air system 20. Air system 20 is formed of any suitable size, shape and design and is configured to facilitate the transportation of grain 14 through the grain handling system 10 through the use of pressurized air blown through tube 40.

Air Input: In the arrangement shown, as one example, air system 20 includes an air input 98. Air input is formed of any suitable size, shape and design and is configured to facilitate the entry of air into air system 20. In the arrangement shown, air input 98 includes a filter 100 positioned at a first end of a stack tube 102 that is connected at a second end to a blower housing 104. Air input 98 facilitates the entry of air into air system 20 while filter 100 filters the air.

Blower, Blower Housing and Blower Motor: In the arrangement shown, as one example, air system 20 includes a blower 103 having a blower housing 104 connected to a blower motor 106. Blower housing 104 is formed of any suitable size, shape and design and is configured to pull air through air input 98, or more specifically through filter 100 and stack tube 102, and blow this air through tube 40. In the arrangement shown, as one example, blower housing 104 includes an exterior shell or housing that contains a fan or pump mechanism therein that causes the movement of air from air input 98 through tube 40. In the arrangement shown, as one example, blower housing 104 is connected to and operated by blower motor 106. Blower motor 106 is formed of any suitable size, shape and design and is configured to facilitate operation of blower housing 104. In the arrangement shown, as one example, blower motor 106 is an electric motor that is connected to a shaft of blower housing 104. In this arrangement, when blower motor 106 rotates so rotates the internal components of blower housing 104. In one arrangement, the faster blower motor 106 rotates the faster the internal components of blower housing 104 rotate. Or, said another way, the higher the output or faster the output of blower motor 106 the higher the output or faster the output of blower housing 104. Any other device other than an electric motor is hereby contemplated for use as blower motor 106 such as a gas powered motor, a steam engine, a belt drive, a chain drive, a gear drive, or any other source of power or rotational force. Also, while the blower motor 106 and blower housing 104 are shown as separate but operably connected components, in another arrangement blower motor 106 and blower housing 104 may be formed of a single integrated unit. Blower housing 104 and blower motor 106 operate in concert with one another to facilitate air flow through tube 40 and as such, reference to one of blower housing 104 or blower motor 106 may refer to both blower housing 104 and blower motor 106 and/or the collective effect of blower housing 104 and blower motor 106 which is to blow pressurized air through tube 40. Also, while a single blower motor 106 is shown, it is hereby contemplated that two or more blower motors 106 may be used. Similarly, while a single blower housing 104 is shown, it is hereby contemplated that two or more blower housings 104 may be used.

In the arrangement shown, as one example, blower motor 106 is electronically connected to and controlled by central controller 24, as is further described herein. In the arrangement shown, as one example, the input side of blower housing 104 is connected to air input 98, which facilitates air flow into blower housing 104. In the arrangement shown, as one example, the output side of blower housing 104 is connected to tube 40, which receives the pressurized air flow out of blower housing 104.

Tube: Tube 40 is formed of any suitable size, shape and design and is configured to receive pressurized air flow from blower housing 104. In the arrangement shown, as one example, tube 40 is a generally cylindrically shaped hollow tube that extends from end-to-end between components of the system 10 as is described herein. Tube 40 may be formed of a single continuous length or a plurality of connected lengths. Where possible, tube 40 may extend in a straight manner, and where necessary tube 40 may bend, curve, split, or join other tubing. Tubing 40 may serve to host, house, and otherwise facilitate connection of other components of the system 10 as is shown and described herein.

Manual Pressure Relief Valve In the arrangement shown, as one example, tube 40 includes a manual pressure relief valve 108. Manual pressure relief valve 108 is formed of any suitable size, shape and design and is configured to facilitate manual venting of air pressure from tube 40. In the arrangement shown, as one example, manual pressure relief valve 108 includes a valve body 110 and an operating mechanism 112. Valve body 110 is formed of any suitable size, shape and design and is configured to selectively open to allow a desired amount of air out of tube 40 when desired. In one arrangement, valve body 110 may be what is known as a globe valve, or a butterfly valve, however any other form of a valve is hereby contemplated for use. Operating mechanism 112 is formed of any suitable size, shape and design and is configured to facilitate manual control of valve body 110. In the arrangement shown, as one example, operating mechanism 112 is formed of a handle that facilitates manual rotation of valve body 110, however any other configuration or arrangement is hereby contemplated for use that facilitates manual control of valve body 110.

Dynamic Pressure Relief Valve: In the arrangement shown, as one example, tube 40 includes a dynamic pressure relief valve 114. Dynamic pressure relief valve 114 is formed of any suitable size, shape and design and is configured to facilitate automatic and/or electronically controlled venting of air pressure from tube 40. In the arrangement shown, as one example, dynamic pressure relief valve 114 includes a valve body 116 and an actuator 118. Valve body 116 is formed of any suitable size, shape and design and is configured to selectively open to allow a desired amount of air out of tube 40 when desired and controlled to do so. In one arrangement, valve body 116 is what is known as a butterfly valve, however any other form of a valve is hereby contemplated for use.

Actuator: Actuator 118 is formed of any suitable size, shape and design and is configured to facilitate automatic and/or electronic control of valve body 116. Actuator 118 is any device which receives power and a control signal and facilitates desired movement of valve body 116. Hydraulic and pneumatic actuators are also hereby contemplated for use. In one arrangement, as one example, an electronic Belimo actuator manufactured by BELIMO Automation AG, Brunnenbachstrasse 1, 8340 Hinwil, Switzerland is used that includes a DC electric motor, overload protection, a direction control switch, an easy manual override button, easy mechanical stops to adjust angle of rotation, among other features and components. In one arrangement, actuator 118 includes a position sensor 120 that provides a highly accurate position of dynamic pressure relief valve 114 that facilitates highly accurate control of dynamic pressure relief valve 114.

In the arrangement shown, as one example, dynamic pressure relief valve 114 and/or actuator 118 is electronically connected to and controlled by central controller 24, as is further described herein.

Pressure Sensor: In the arrangement shown, as one example, tube 40 includes at least one pressure sensor 122. Pressure sensor 122 is formed of any suitable size, shape and design and is configured to sense the pressure within tube 40. That is, pressure sensor 122 is any device which measures the pressure of gasses or fluids within tube 40. In one arrangement, pressure sensor 122 acts as a transducer in that it generates a signal as a function of the pressure imposed upon the operable portions of the sensor. In the arrangement shown, as one example, pressure sensor 122 is positioned in tube 40 between blower motor 106, manual pressure relief valve 108 and dynamic pressure relief valve 114 on one side, and rotary airlock 124 on the other side, however any other placement and/or position in tube 40 is hereby contemplated. In one arrangement, pressure sensor 122 may be positioned at any point along tube between blower motor 106 and rotary airlock 124.

In the arrangement shown, as one example, only a single pressure sensor is shown in use. This use of a single pressure sensor 122 may be acceptable in many applications as the pressure throughout the length of tube 40 may be relatively consistent. However, it is hereby contemplated that any number of pressure sensors 122 may be used at any position along the length of tube 40 such as two, three, four, five, six, seven, eight, nine or ten or more as may be needed or useful in a particular application. These additional pressure sensors 122 may be positioned at any position along the length of tube 40 and may be placed between rotary airlock 124 and dry grain bin 22. In the arrangement shown, as one example, pressure sensor(s) 122 is electronically connected to and provides information to central controller 24, as is further described herein.

Rotary Airlock: In the arrangement shown, as one example, system 10 is used in association with a rotary airlock 124. Rotary airlock 124 is formed of any suitable size, shape and design and is configured to meter grain 14 into tube 40 from grain dryer 18 in a controlled manner while minimizing air pressure loss. Rotary airlock 124, also known as a rotary airlock feeder, is any device that facilitates transferring material between two vessels with differing pressures while minimizing air loss. In the arrangement shown, as one example, rotary airlock 124 includes a housing 126 and a motor 128 among other features and components.

Housing 126 is formed of any suitable size, shape and design and is configured to meter grain 14 from its input 130 to its output 132 in a controlled manner while minimizing air pressure loss. In the arrangement shown, as one example, housing 126 includes an exterior shell or housing that contains metering vanes therein that causes the movement of grain 14 from input 130 to output 132. In the arrangement shown, as one example, housing 126 is connected at its input 130 to the outlet 96 of grain dryer 18 such that grain 14 dispensed out of grain dryer 18 is transported to housing 126 where it is metered into tube 40 while minimizing air pressure loss. In the arrangement shown, as one example, housing 126 is connected at its output 132 to tube 40 such that grain 14 metered through housing 126 is transferred to tube 40, which then transfers the grain 14 along the length of tube 40 under the air pressure and air flow within tube 40.

Motor 128 is formed of any suitable size, shape and design and is configured to facilitate operation of housing 126. In the arrangement shown, as one example, motor 128 is an electric motor that is connected to a shaft of housing 126. In this arrangement, when motor 128 rotates so rotates the internal components of housing 126. In one arrangement, the faster motor 128 rotates, the faster the internal components of housing 126 rotate thereby dispensing grain at a higher rate. Or, said another way, the higher the output or faster the output of motor 128 the higher the output or faster the output of housing 126. Any other device other than an electric motor is hereby contemplated for use as motor 128 such as a gas powered motor, a steam engine, a belt drive, a chain drive, a gear drive, or any other source of power or rotational force. Also, while the motor 128 and housing 126 are shown as separate but operably connected components, in another arrangement motor 128 and housing 126 may be formed of a single integrated unit. Motor 128 and housing 126 operate in concert with one another to facilitate the transfer of grain 14 to tube 40 and as such, reference to one of motor 128 and housing 126 may refer to both motor 128 and housing 126 and/or the collective effect of motor 128 and housing 126 which is to dispense grain 14 into tube 40. Also, while a single motor 128 and housing 126 is shown, it is hereby contemplated that two or more motors 128 and/or housings 126 may be used.

In the arrangement shown, as one example, rotary airlock 124 and/or motor 128 is electronically connected to and controlled by central controller 24, as is further described herein.

Once grain 14 is dispensed into tube 40 from rotary airlock 124, this grain 14 is carried along the length of tube 40 in the air flow from blower 103 until it is deposited through the opening 54 in roof 46 for storage in dry grain bin 22.

Central Controller:

In the arrangement shown, as one example, system 10 is used in association with a central controller 24. Central controller 24 is formed of any suitable size, shape and design and is configured to receive information from electronic components of system 10, process this information according to instructions stored in memory and output commands thereby controlling operation of these electronic components.

In the arrangement shown, as one example, a single central controller 24 is electronically connected to electronic components of system 10 and is configured to receive information from these electronic components as well as output commands thereby controlling operation of these electronic components. While the term "central controller" is used herein, this term is not intended to limit central controller 24 to only a single centrally located electronic component or components housed at a single location. That is, central controller 24 may be formed of a single electronic component or grouping of electronic components located at a single location or co-located position. Central controller 24 may also be a plurality of electronic components that are located in disparate locations but are electrically connected to one another and operate in concert with one another through the sharing of information to facilitate a desired outcome. In this way, the term "central controller" is not intended to be limited by physical location. The term "central controller" is only intended to imply a centralized and coordinated manner and method of control. Central controller 24 may be formed of a single electronic device, or any number of connected electronic devices.

At a high level, in one arrangement, central controller 24 controls operation of air system 20 as well as grain dryer 18 or any other device or system that serves as a source of grain 14 into air system 20 such as an auger, a grain leg, or the like. In this way, central controller 24 may control the input of grain 14 into air system (from grain dryer 18 or another source of grain 14) as well as control operation of air system 20 which conveys the grain 14). This allows central controller 24 to optimize performance of air system 20 as well as react to changes in operation as well as detect and anticipate plugs in air system 20 and begin an unplugging routine in response to a plug.

In the arrangement shown, as one example, central controller 24 may be electrically connected to and receive information from and control operation of motor 64 of auger 58 of input device 16 and any related sensors; loading system 68, metering system 80, and discharge system 82 of grain dryer 18 and any related sensors; and blower motor 106, actuator 118 and position sensor 120 of dynamic pressure relief valve 114, pressure sensor 122 and motor 128 of rotary airlock 124 of air system 20 and any related sensors. By being electronically connected to these electronic components central controller 24 may control, adjust (speed up or slow down), stop and start operation of these electronic components in concert with one another.

In one arrangement, central controller 24 includes a processor 134 that is electronically connected to memory 136 having instructions 138 stored therein. Processor 134 is any computing device that receives and processes information and outputs commands according to instructions 138 stored in memory 136. Memory 136 is any form of a device that facilitates information storage as well as retrieval such as flash memory, ram memory, a hard drive, or any other form of memory. Memory 136 and processor 134 may be formed of a single combined component, or memory 136 and processor 134 may be formed of multiple co-located or separated components that operate in concert with one another. Instructions 138 are any form of instructions that provide guidance to processor 134 as to how to interpret information and react to information and may be software, algorithms, code, parameters or the like.

Variable Frequency Drive: In one arrangement, central controller 24 includes and/or is electrically connected to a variable frequency drive 140 (or VFD 140) which is electronically connected to and controls operation of blower motor 106. Variable frequency drive 140 is formed of any suitable size, shape and design and is configured to adjustably control operation of blower motor 106. Variable frequency drive 140, also known or referred to as an adjustable-frequency drive, variable-voltage/variable-frequency (VVVF) drive, variable speed drive, AC drive, micro drive or inverter drive is any type of an adjustable-speed drive used in electro-mechanical drive systems to control AC motor speed and torque by varying motor input frequency and voltage.

The use of variable frequency drive 140 allows the speed of blower motor 106 to be adjusted and/or optimized. This allows the air pressure within tube 40 to be adjusted to desired levels by adjusting the rotational speed of blower motor 106. Variable frequency drive 140 adds cost and complexity to the system 10. However, the use of variable frequency drive 140 allows central controller 24 to operate blower motor 106 in a more-efficient manner by matching the output of blower motor 106 with the desired air pressure within tube 40 for optimum performance.

Without variable frequency drive 140, blower motor 106 is operated at full capacity, regardless of the desired air pressure within tube 40. Then, to achieve the desired air pressure within tube 40, manual pressure relief valve 108 or dynamic pressure relief valve 114 is opened to the desired level to bleed off excessive air pressure within tube 40. This process is energy inefficient and wasteful, but it is simpler and more cost-effective up-front as variable frequency drive 140 and the supporting electronics and programming is complex and expensive. However, over time, due to the energy savings provided by use of variable frequency drive 140, implementing variable frequency drive 140 provides cost savings.

Programmable Logic Controller: In one arrangement, central controller 24 includes and/or is electronically connected to a programmable logic controller 142 (or PLC 142), which is electronically connected to pressure sensor 122. Programmable logic controller 142 is formed of any suitable size, shape and design and is fed and/or configured to read and track the pressure within tube 40 from pressure sensor 122 and in response thereto control operation of the variable frequency drive 140/blower motor 106 and/or dynamic pressure relief valve 114/actuator 118. Alternatively, this functionality is provided by central controller 24 and/or another electronic component of the system 10.

Other Electronic Components: System 10 and/or central controller 24 includes any other electronic component that is needed to control operation of the system 10.

In one arrangement, system 10 and/or central controller 24 includes and/or is electrically connected one or more current sensors 144. Current sensor 144 is any device which senses the amount of current or energy drawn or used by a motor. Current sensor 144 may be used in association with motor 64 of auger 58 of input device 16, any of the motors operating in association with grain dryer 18, blower motor 106, motor 128 of rotary airlock 124, or any other motor of the system 10.

In one arrangement, current sensor 144 is a standalone, separate and added electronic component. In another arrangement, current sensor 144 is incorporated within and/or within the functionality of another component of the system 10 such as within the motor, within variable frequency drive 140, and/or within any other component of the system 10. In one arrangement, as variable frequency drive 140 senses current draw of the attached motor, variable frequency drive serves as the current sensor 144 (and can also serve as the motor speed sensor 146, among others).

In one arrangement, system 10 and/or central controller 24 includes and/or is electrically connected to one or more motor speed sensors 146. Motor speed sensor 146 is any device which senses the rotational speed or other speed of a motor. Motor speed sensor 146 may be used in association with motor 64 of auger 58 of input device 16, any of the motors operating in association with grain dryer 18, blower motor 106, motor 128 of rotary airlock 124, or any other motor of the system 10.

In one arrangement, motor speed sensor 146 is a standalone, separate and added electronic component. In another arrangement, motor speed sensor 146 is incorporated within and/or within the functionality of another component of the system 10 such as within the motor, within variable frequency drive 140, and/or within any other component of the system 10.

In one arrangement, system 10 and/or central controller 24 includes and/or is electrically connected to one or more grain speed sensors 148. Grain speed sensor 148 is any device which senses the speed of grain 14 passing through the tube 40. However, approximate grain speed can be deduced from air pressure within tube 40.

In one arrangement, system 10 and/or central controller 24 includes and/or is electrically connected to one or more proximity sensors 150. Proximity sensor 150 is any device which senses the presence of or lack of presence of gain 14 at various positions along the path of grain 14 in the system 10.

In one arrangement, system 10 and/or central controller 24 includes and/or is electrically connected to one or more position sensors 120. Position sensor 120 is any device which senses the position of a component of the system 10, such as the position of the dynamic pressure relief valve 114 or the like.

Any other sensor that yields information that can be used to control the system 10 is hereby contemplated for use. With the information from position sensor(s) 120, pressure sensor(s) 122, current sensor(s) 144, motor speed sensor(s) 146, grain speed sensor(s) and proximity sensor(s) 150

Human Machine Interface:

In the arrangement shown, as one example, system 10 is used in association with a human machine interface 152 (or HMI 152). Human machine interface 152 is formed of any suitable size, shape and design and is configured to facilitate human control of system 10 through the entry of information and commands and user controlled settings into system 10. In the arrangement shown, as one example, human machine interface 152 is electronically connected to and facilitates control of central controller 24, and therefore control of the system 10. In the arrangement shown, as one example, human machine interface 152 includes a touch screen that both displays information on a display 154 as well as receives information through touching the screen by a user. Any other form of a human machine interface is hereby contemplated for use such as a graphical user interface with a mouse arrangement, a keyboard arrangement, voice control and/or the like or any combination thereof.

In one arrangement, central controller 24 and/or human machine interface 152 is electronically connected to the internet 26 through the cloud 28 and/or a wireless network 30, such as a cell tower or the like. This connection facilitates control of the system 10 remotely through a user's electronic device 32 such as a desktop or laptop computer 34, a cell phone 36, a tablet 38 or any other computing device. This is accomplished through the display of display 154 on the user's electronic device 32 and the transfer of commands and information between the system 10 on one side and the user on the other side through use of the user's electronic device 32.

In Operation—System with Manual Pressure Relief Valve and no Dynamic Pressure Relief Valve or Variable Frequency Drive:

In this example of operation of grain handling system 10 this example of grain handling system 10 includes an input device 16, a grain dryer 18, and an air system 20 and does not include a dynamic pressure relief valve 114 or a variable frequency drive 140. In this example, without a variable frequency drive 140 blower motor 106 is started with a line start or a soft start or the like and blower motor 106 is continuously operated at or near full capacity or at another static capacity. That is, without variable frequency drive 140, in one arrangement, blower motor 106 is essentially operated in a binary manner. That is, blower motor 106 is either on, at full capacity or another static capacity, or off. This is because system 10 and/or central controller 24 lacks the ability to dynamically adjust the speed of blower motor 106 in response to changes in the operation of the system 10.

When blower motor 106 is operated at full capacity it is likely that blower motor 106 is supplying too much air to tube 40 and as a result the grain 14 may be damaged as it passes through tube 40. To correct this problem and to reduce the speed of the grain 14 as it passes through tube 40 manual pressure relief valve 108 is manually operated by operating mechanism 112 which opens and closes valve body 110 until the desired amount of air is bled from tube 40. Bleeding air from tube 40 has the result of moving grain 14 through tube 40 at a desired reduced speed that maximizes capacity while minimizing damage to grain 14. As such, speed of the grain 14 traveling through tube and capacity must be carefully balanced to maximize capacity while minimizing damage to grain 14. In one arrangement it is desirable to aim for anywhere between three or four PSI within tube 40 on the low end of the range and eight PSI on the upper end of the range, with approximately six PSI as the target.

While this arrangement is effective when set, one problem with this arrangement is that air system 20 has a tendency to plug when operated at or near its limits. Changes in humidity, outside air temperature, moisture content of grain 14, temperature of grain 14, debris or fines content in grain 14, the rate at which grain 14 is added to tube 40, the consistency or variability at which grain 14 is added to tube 40, weight of grain 14, size of grain 14, or countless other variables have a tendency to affect operation of air system 20. As these factors are constantly changing it is hard to set air system 20 to its maximum capacity without risking damaging grain 14 and/or plugging tube 40. As such, this manual system 10 requires constant attention and constant manual adjustment to ensure optimum efficiency with maximum capacity while minimizing damage to grain 14.

In many cases, to avoid plugging of the air tube 40, and to compensate for this arrangement's inability to adjust to variations in operation, in practice users tend to set the air system 20 in a very conservative manner. That is, that air system 20 is set such that the amount of grain 14 introduced into the air tube 40 is well below the full capacity of the air system 20. This conservative setting is intended to avoid plugging at practically all costs because in this arrangement when a plug occurs a fault setting is triggered (which may either be an air pressure fault in air tube 40, a current draw fault in blower motor 106 or another fault) the entire system 10 is shut down until manual attention is provided to clear the plug. This has the result of substantially reducing the throughput of grain 14 through the air tube 40 as well as overly-damaging grain 40 as it passes through air tube 40. Again, this is because these drawbacks are substantially better than facing continual shutdowns due to plugs.

In addition to the above, it is energy inefficient to run blower motor 106 at maximum capacity or a higher capacity than is needed and then bleeding off a portion of the air pressure generated.

Another problem with this manual system is that it does not have a feedback loop that can adjust to changes in the variables that affect the air system 20.

More specifically, in this arrangement, central controller 24 may receive signals regarding the operation of the system 10 from some or all of the following sensors:

Pressure sensors 122 that provide the air pressure within tube 40;

Current sensors 144 that provide the current or power draw of the connected motor, such as motor 64 of auger 58 of input device 16, motors associated with grain dryer 18 such as loading system 68, metering system 80 (interior metering roll 84, exterior metering roll 86), discharge system 82, blower motor 106 of blower 103, the motor of dynamic pressure relief valve 116, motor 128 of rotatory airlock 124, and/or any other motor of the system;

Motor speed sensors 146 that provide the speed of the connected motor, such as motor 64 of auger 58 of input device 16, motors associated with grain dryer 18 such as loading system 68, metering system 80 (interior metering roll 84, exterior metering roll 86), discharge system 82, blower motor 106 of blower 103, motor 128 of rotatory airlock 124, and/or any other motor of the system;

Grain speed sensors 148 that provide the speed of grain 14 moving through tube 40 or through other components of the system 10 such as into, through or out of wet grain bin 12, input device 16, grain dryer 18, air system 20, dry grain bin 22 and/or any other component of the system 10;

Proximity sensors 150 that provides information regarding the presence of grain 14 at any positon of system 10 including tube 40, wet grain bin 12, input device 16, grain dryer 18, air system 20, dry grain bin 22 and/or any other component of the system 10;

Any other sensor connected with system 10.

Central controller 24 may also receive information regarding operation of any other component of the system 10. In response to receiving this information, central controller 24 processes this information using processor 134 and/or programmable logic controller 142 according instructions 138 stored in memory 136 and outputs commands that controls the electronic components of the system 10.

Central controller 24 may control operation of the connected electronic components. However, central controller 24 cannot adjust the speed of blower motor 106 as this manual system 10 lacks variable frequency drive 140 that is controlled by central controller 24. In addition, central controller 24 cannot adjust the position of a bleed valve as this manual system 10 lacks a dynamic pressure relief valve 114 that is controlled by central controller 24. As such, while central controller 24 may monitor operation of various components of the system 10, central controller 24 has limited options as to how to respond.

Figure 5:
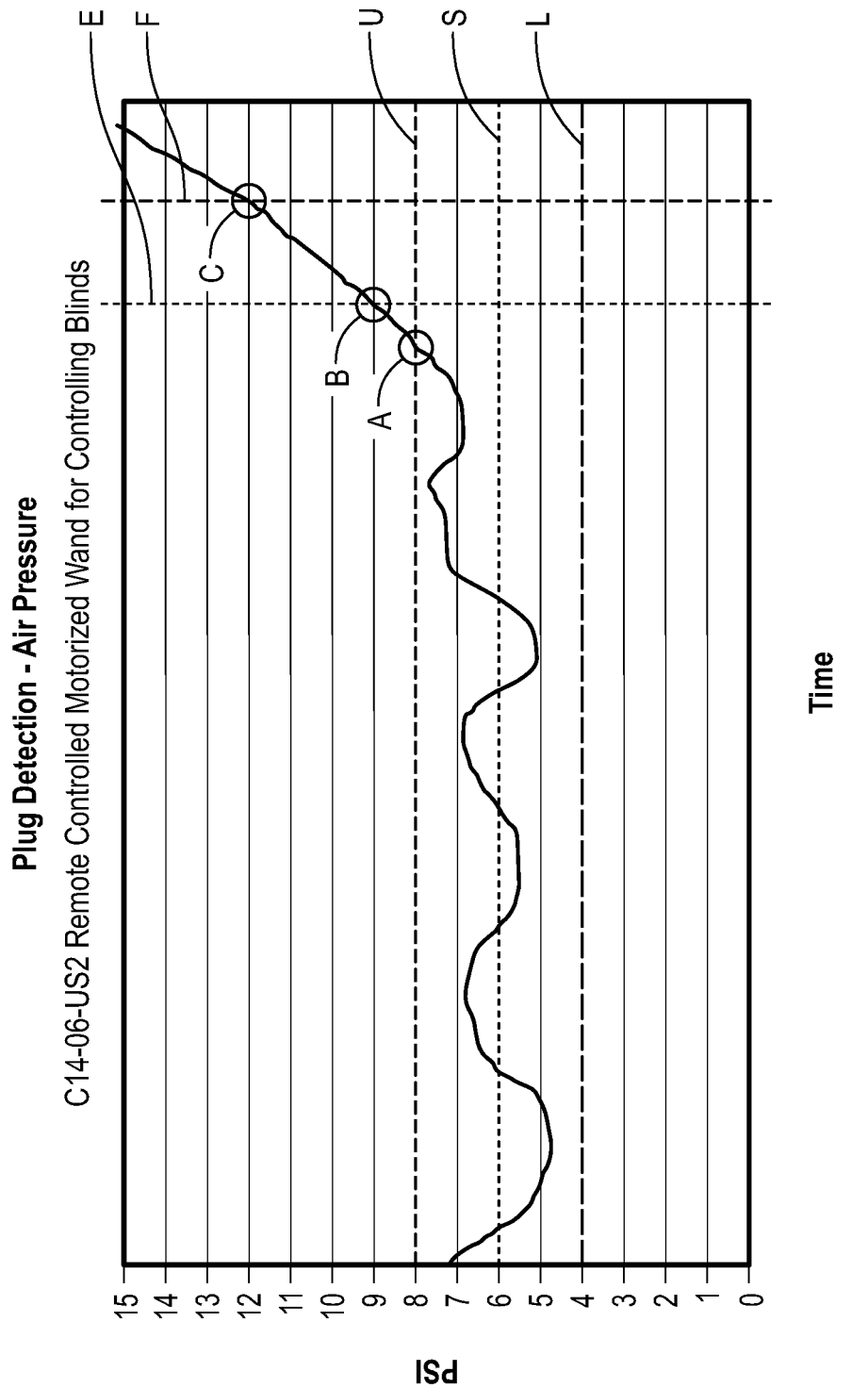
FIG. 5 is a plan view of a demonstrative chart showing air pressure in normal operation as well as when a plug occurs.

In one arrangement, as one example, with reference to FIG. 5 a demonstrative chart showing air pressure in normal operation as well as when a plug occurs is presented. On this demonstrative chart, PSI is shown as the vertical axis, and time is the horizontal axis. On this demonstrative chart, the set point is shown as the dashed line "S", the upper limit to the normal range of operation is shown as the dashed line "U", and the lower limit to the normal range of operation is shown as the dashed line "L." On this demonstrative chart, the fault line is shown as the dashed line "F" which indicates when a fault has occurred, and the early detection line is shown as the dashed line "E" which indicates a point where the central controller 24 may determine that the early signs of a plug have occurred. In one arrangement, these points may be set by the user or they may be set by the central controller 24 during operation.

As one example of operation, with reference to FIG. 5, central controller 24 receives pressure information regarding the air pressure within tube 40 from pressure sensor 120 and central controller 24 tracks this information. As is shown on the demonstrative graph of FIG. 5, for the majority of the graph the sensed pressure oscillates around six PSI within the desired range between four PSI and eight PSI. This indicates expected normal operation where grain 14 is flowing through tube 40 at a high capacity while not overly damaging the grain 14.

This normal operation continues until the PSI crosses the "U" line which indicates the upper limit of normal operation which in this example is eight PSI. This is shown as point "A" on the chart. This indicates a spike in pressure which indicates a plug may be occurring or just occurred in tube 40 which is detected by central controller 24 using processor 134 and instructions 138 stored in memory 136. This increase in pressure continues until the air pressure crosses the early detection line "E" at point "B" which indicates an early detection of a plug has occurred as this point is well outside of the boundaries of normal operation while being well short of a fault, shown as fault line "F". At the point where the PSI crosses the vertical dashed line, at approximately twelve PSI at point "C", central controller 24 using processor 134 and instructions 138 stored in memory 136 confirms that a plug has occurred in tube 40 and a fault is tripped. Again, these parameters "S," "L," "U," "E," and/or "F" may be user defined, preset or determined in a dynamic fashion by central controller 24 using processor 134 and instructions 138 stored in memory 136. Early detection "E" and fault "F" can be determined by central controller 24 using processor 134 and instructions 138 stored in memory 136 based on the speed and/or magnitude of a move in a sensed parameter.

Figure 6:
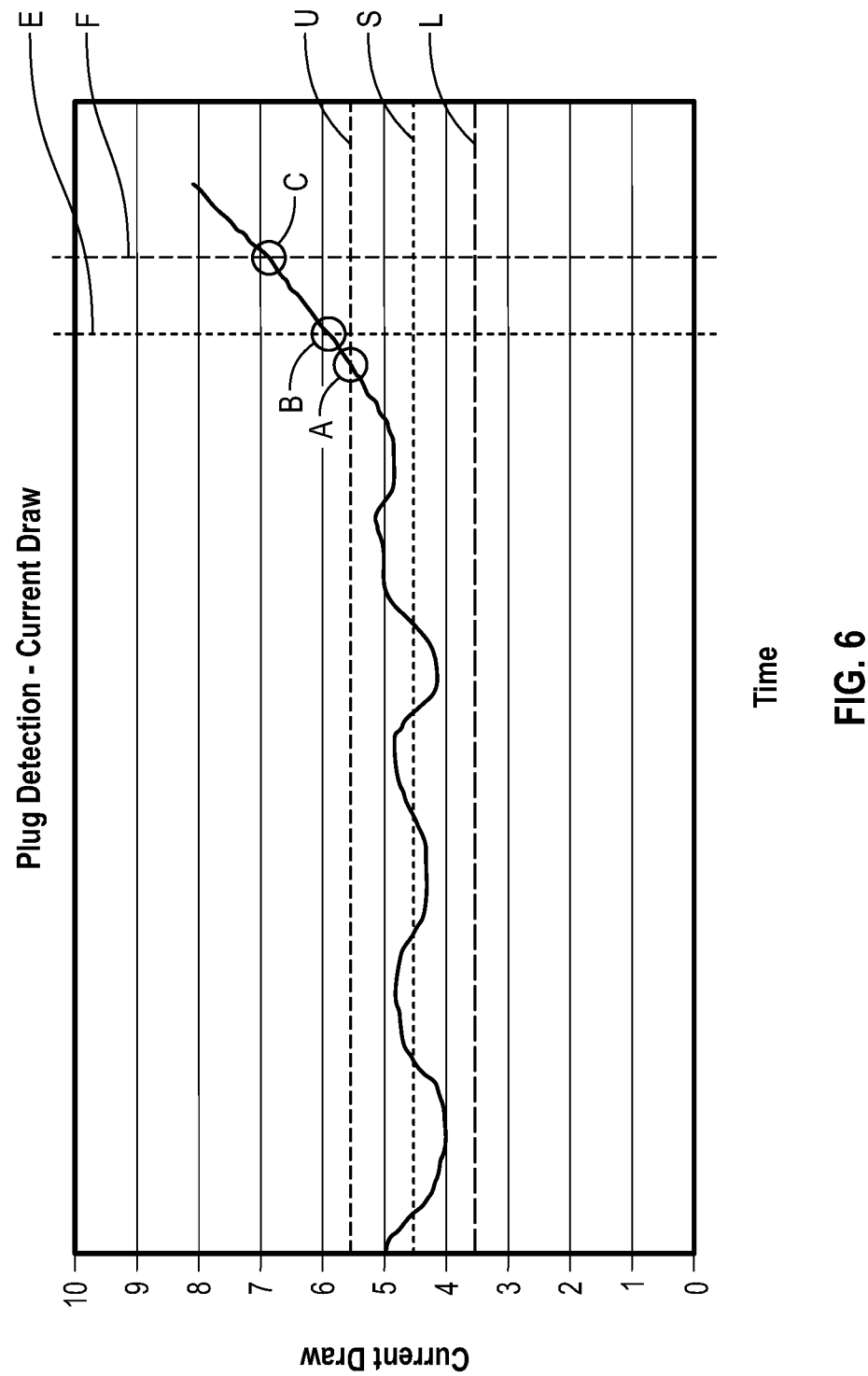
FIG. 6 is a plan view of a demonstrative chart showing current draw of a blower motor in normal operation as well as when a plug occurs.

As an alternative and/or redundant manner of detecting when a plug occurs, in one arrangement, with reference to FIG. 6, a similar demonstrative graph is presented that shows current draw as opposed to PSI shown in FIG. 5. In this arrangement, central controller 24 receives current draw information regarding the current draw of blower motor 106 from current sensor 144. As is shown on the demonstrative graph of FIG. 6, for the majority of the graph the sensed current draw oscillates around set point "S" within the desired range between upper limit "U" and lower limit "L" before spiking at the end of the graph and crossing early detection line "E" and eventually fault line "F" in a similar manner to that shown on FIG. 5 in PSI. At the point where the current draw crosses the vertical dashed line "F" indicating a fault has occurred, central controller 24 using processor 134 and instructions 138 stored in memory 136 confirms that a plug has occurred in tube 40.

As an alternative and/or redundant manner of detecting when a plug occurs, information from any other sensor or any other source of information may be used to determine that a plug has occurred such as motor speed sensor 146, grain speed sensor 148, proximity sensor 150 or any other sensor.

Figure 7:
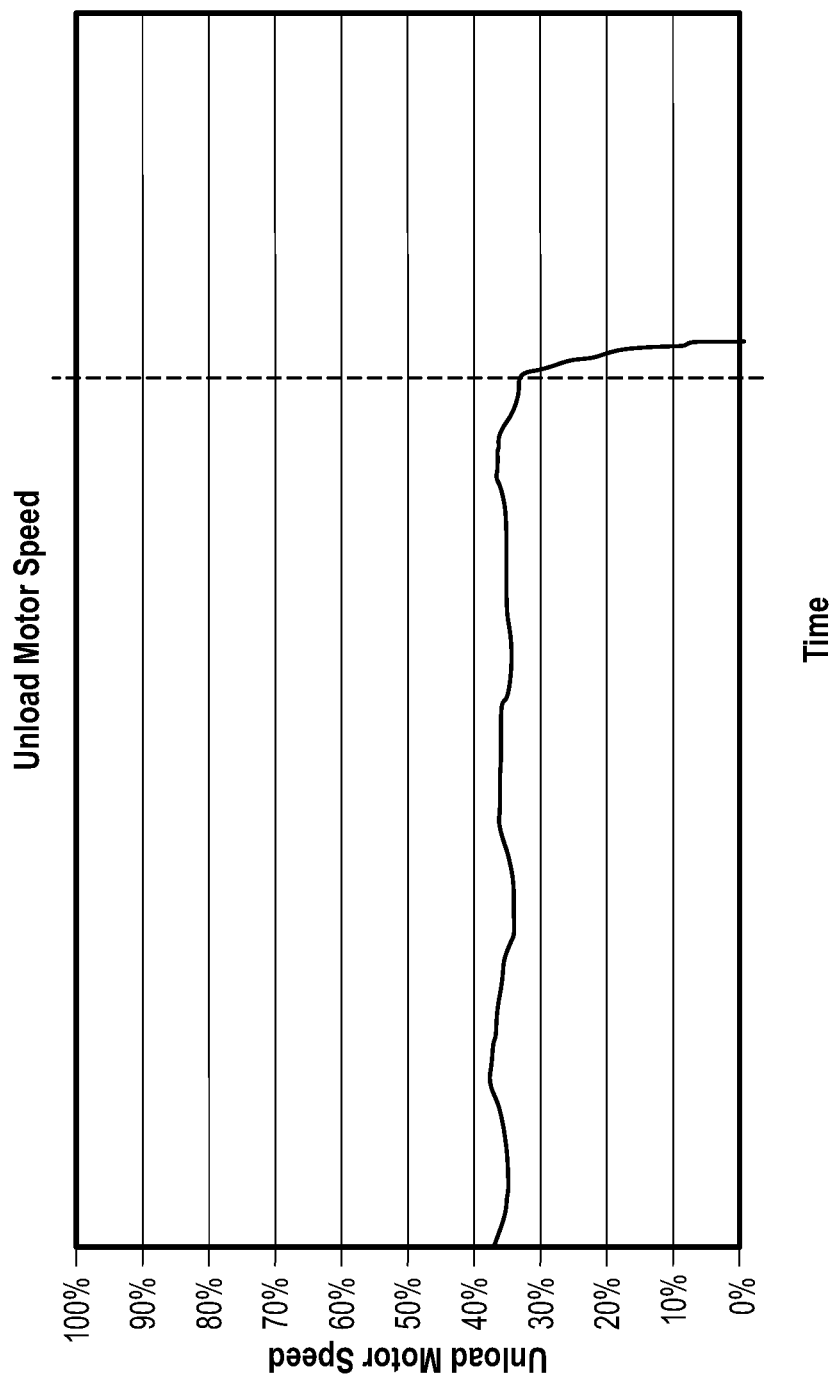
FIG. 7 is a plan view of a demonstrative chart showing unload motor speed in normal operation as well as when a plug is detected.

In response to detecting a plug has occurred, central controller 24 shuts down the entry of grain 14 into tube 40 so as to prevent the plug from getting worse. This may occur by stopping operation of any and/or all components of system 10 or more specifically by stopping rotation of motor 128 of rotary airlock 124 and/or stopping operation of discharge system 82, metering system 80 and/or loading system 68 of grain dryer 18, and/or stopping operation of motor 64 of auger 58 of input device 16 and/or stopping operation of any other component or components of the system 10. This is shown in a demonstrative graph of FIG. 7 wherein the unload motor speed of the motors identified herein (such as motor 128 of rotary airlock 124 and/or the motors associated with discharge system 82, metering system 80 and/or loading system 68 of grain dryer 18, and/or motor 64 of auger 58 of input device 16 and/or any other motor of the system) operate until the vertical line on the graph at which point central controller 24 stops operation of the motor(s).

Once the flow of grain 14 has been stopped, central controller 24 has ensured that the plug is not made worse. Thereafter, in one arrangement central controller 24 using processor 134 and instructions 138 stored in memory 136 continues operation of blower motor 106 in an attempt to clear the plug. In this arrangement, blower motor 106 may be operated for a predetermined amount of time, until a limit has been hit or exceeded (such as a pressure limit, current draw limit, motor speed limit, motor temperature limit, time limit or any other limit) and/or until a calculated limit is reached or exceeded based on an algorithm or other programming. If the plug is not cleared, central controller 24 stops blower motor 106 so as to protect blower motor 106 from damage and/or self-destruction.

Once the blower motor 106 has been stopped, with the plug remaining in tube 40, manual labor is required to clear the plug.

It is worthwhile to note, that when a plug is detected in this arrangement, central controller 24 has limited options as to how to respond as the central controller 24 is not connected to a variable frequency drive 140 that can ramp up and ramp down operation of blower motor 106, and is also not connected to a dynamic pressure relief valve 114 having a controllable actuator 118 that can be used to selectively bleed air from tube 40. As such, to save blower motor 106, all central controller 24 can do is shut down the flow of grain 14 into tube 40 and simultaneously or later shut down operation of blower motor 106 after a limited amount of time of additional operation of blower motor 106. It is unlikely that this limited amount of time of continued operation of blower motor 106 after a plug has occurred will clear the plug.

Early Detection: One of the benefits of the system 10 is that it provides early detection of a plug and in view of early detection of a potential plug the system 10 can make adjustments to avoid the plug, minimize the plug and/or clear the plug. In one arrangement, when the air pressure crosses the early detection line "E" central controller 24 using processor 134 and instructions 138 stored in memory 136 determines that an early detection of a plug has occurred or the early signs of a plug have appeared in the operational characteristics of the system 10. This early detection of a plug occurs well above the upper limit line "U" and well before the fault line or parameter "F," however that may not always be the case depending on the starting position, the speed and/or magnitude of a move in a sensed parameter (meaning that an early detection of a plug can occur within the upper and lower limits of normal operation so long as the move meets other speed or magnitude characteristics thereby allowing for its early detection.

In response to this early detection, in this arrangement, central controller 24 using processor 134 and instructions 138 stored in memory 136 stops or alternatively slows down the entry of grain into air tube 40 by slowing or stopping rotary airlock 124, and/or by slowing or stopping the flow of grain 14 into rotary airlock 124 by closing a gate 156 in or along input tube 158 and/or surge bin 160 which facilitates the flow of grain 14 into rotary airlock 124, and/or by slowing or stopping the flow of gain 14 into rotary airlock 124 by slowing or stopping discharge system 82 of grain dryer 18 and/or metering system 80 of grain dryer 18 and/or slowing or stopping any other component of the system that facilities the flow of grain 14 to rotary airlock 124 and/or air system 20. This is so as to ensure that more gain 14 is not added to this potential plug, thereby making the plug worse. Sensing an early detection of a plug and stopping, or at least slowing down, the flow of grain 14 into air tube 40 in response to an early detection of a plug stops or limits the amount of grain 14 that enters air tube 40 in the time between the early detection line "E" and the fault line "F."

If the potential plug clears, and the air pressure drops in response thereto, central controller 24 using processor 134 and instructions 138 stored in memory 136 detects this drop in air pressure and again automatically reinitiates the flow of grain into air tube 40. In doing so, central controller 24 using processor 134 and instructions 138 stored in memory 136 in an attempt to avoid another plug central controller 24 using processor 134 and instructions 138 stored in memory 136 starts metering grain 14 into air tube 40 at a slow or slower initial rate. Thereafter, central controller 24 using processor 134 and instructions 138 stored in memory 136 monitors the air pressure in air tube 40 for a period of time ensuring that another plug does not occur during the initial reentry of grain. Central controller 24 using processor 134 and instructions 138 stored in memory 136 continues to iteratively increase the amount of grain added to air tube 40 followed by periods of monitoring the air pressure in the air tube 40 until the desired air pressure range is achieved.

In this way, system 10 may be used to early detect when a plug has occurred and quickly take preventative and corrective measures. In this way, system 10 may be used to continually push up the through-put of the air system 20 by continually trying to increase the amount of grain 14 added to air tube 40 and when an early detection of a plug occurs, the flow of grain is stopped or reduced thereby allowing the potential plug to clear before the central controller 24 using processor 134 and instructions 138 stored in memory 136 again tries to resume normal, maximized, operation (while avoiding plugs).

In this way, the system 10 presented herein (even without the use of dynamic pressure relief valve 114 and/or variable frequency drive 140) may be used to maximize through put of air system 20 while providing some of the self-clearing functions by quickly detecting that a plug could be occurring and in response adjusting the flow of grain 14 into air tube 40. During operation of this arrangement, central controller 24 using processor 134 and instructions 138 stored in memory 136 may adjust the flow of grain 14 into air tube 40 up or down as dyna mics change within the system 10 thereby maximizing throughput of air system 20 while reducing the potential for a plug.

As the through-put of the air system 20 is increased, central controller 24 using processor 134 and instructions 138 stored in memory 136 may in-turn increase the throughput of grain dryer 18 or any other input device 16. This may include increasing the plenum temperature (also known as the drying temperature), the fan speed, the speed of the metering system 80 (metering rolls 84, 86), the speed of the discharge system 82, the speed of loading system 68, and/or the speed or operational parameter of any other portion of the grain dryer 18. As such, in this way, by providing a hand-shake and exchange of dynamic information between the grain dryer 18 and the air system 20, which has never been done before, both the grain dryer 18 and the air system 20 may be run at their maximum capacity and maximum efficiency in real time, automatically and without user intervention. Never before has information been shared between a grain dryer 18 and an air system 20 through a central controller 24 that allows improved control of an air system 20 based on the dynamic and real time operational parameters of a grain dryer 18, and vice versa, that allows improved control of a grain dryer 18 based on the dynamic and real time operational parameters of an air system 20.

The system 10 presented herein allows for maximized and optimized operation of an air system 20 as well as an input system 16, such as a grain dryer 18 in concert with one another. It is undesirable to have either an air system 20 or an input system 16, such as a grain dryer 18, run substantially faster or slower than the other. Instead, it is desirable to maximize the output of the slower of an air system 20 or an input system 16, such as a grain dryer 18, and balance the other of an air system 20 or an input system 16, such as a grain dryer 18, to optimize its operation to the desired input or output. The system 10 presented herein facilitates this optimized operation through the interconnection and data sharing between air system 20 and grain dryer 18 and mutual control of the air system 20 and grain dryer 18 through central controller 24.

Fault Limit Reached: In the event that a fault limit is reached and/or exceed, such as at point "C" on FIG. 5 when the PSI line crosses the fault line "F," in one arrangement, (without dynamic pressure relief valve 114 and/or variable frequency drive 140) central controller 24 shuts down the flow of grain 14 into air tube 40 as well as shuts down operation of blower motor 106. By shutting down operation of blower motor 106 this lets the air pressure within air tube 40 dissipate such that the air pressure within the tube balances with atmospheric pressure. By allowing all air pressure to dissipate this may have the effect of clearing, breaking up or loosening the plug. Thereafter, after a predetermined amount of time, central controller 24 again reinitiates the operation of blower motor 106. In doing so, blower motor 106 again pressurized air tube 40.

If, after shutting down blower motor 106, waiting a predetermined amount of time, and then reinitiating operation of blower motor 106 central controller 24 detects the plug has cleared, central controller 24 resumes normal operation as is described herein, such as by slowly increasing the flow of grain 14 into air tube 40 until operation is again maximized. If, after reinitiating operation of blower motor 106 the plug remains and the pressure or current draw or other parameter spikes to the fault "F" position, the central controller 24 again shuts down operation of the blower motor 106, waits a predetermined amount of time for the pressure to clear before starting blower motor 106 again.

This turning on and turning off of blower motor 106 may be performed iteratively any number of cycles such as 1, 2, 3, 4, 5, 6, 7, 8, 9 or 10 or more times until either the plug clears and normal operation resumes without manual intervention being required, or alternatively central controller 24 determines that the plug cannot be automatically cleared and manual intervention is required. This allows for potential auto-clearing of a plug by central controller 24 even without system 10 having a dynamic pressure relief valve 114 and/or a variable frequency drive 140. As such, this iterative turning on and turning off of blower motor 106 may be considered an unplugging routine.

In Operation—System with Dynamic Pressure Relief Valve and no Variable Frequency Drive:

In this example of operating grain handling system 10, grain handling system 10 includes an input device 16, a grain dryer 18, an air system 20 and a dynamic pressure relief valve 114 and does not include a variable frequency drive 140. In this example, with the addition of a dynamic pressure relief valve 114, all of the operational teachings presented above with respect to a system 10 without either a dynamic pressure relief valve 114 or a variable frequency drive 140 apply with the added ability to adjust the pressure relief valve 114. That is, all prior teaching herein is incorporated into and applicable to this example (unless stated otherwise) as well as the further teaching presented below.

In this example, blower motor 106 is continuously operated at or near full capacity or at another static capacity. That is, without variable frequency drive 140, in one arrangement, blower motor 106 is essentially operated in a binary manner. That is, blower motor 106 is either on, at or near full capacity or another static capacity, or off, as system 10 lacks the ability to adjust the speed of blower motor 106.

In this arrangement, central controller 24 receives signals regarding the operation of the system 10 from some or all of sensors identified above in the system 10 with the manual pressure relief valve 108. In addition this system 10 includes at least one position sensor 120 that provides the position information of dynamic pressure relief valve 114 having an actuator 118.

In this arrangement, during operation of the system 10, central controller 24 tracks air pressure in tube 40 through pressure sensor 122 as well as current draw of blower motor 106 through current sensor 144, as well as any other information from any other sensor or component of the system 10.

In this arrangement, in response to the information received by central controller 24, using processor 134 and instructions 138 stored in memory 136, central controller 24 may precisely adjust the position of dynamic pressure relief valve 114 by controlling operation of valve body 116 using electronic control of actuator 118. In doing so, the precise position of the valve body 116 is reported back to central controller 24 in a feedback loop using position sensor 120. In addition, the pressure within tube 140 is continuously fed back to central controller 24 by pressure sensor 122. In this way, and with this feedback loop of continuous pressure and position information, central controller 24 may adjust the amount of air that is bled-off of tube 40 so as to maintain optimum pressure within tube 40. In this way, system 10 with the addition of dynamic pressure relief valve 116, central controller 24 may adjust for varying factors (such as changes in humidity, outside air temperature, moisture content of grain 14, temperature of grain 14, debris or fines content in grain 14, the rate at which grain 14 is added to tube 40, the consistency or variability at which grain 14 is added to tube 40, weight of grain 14, size of grain 14, or any other variable) that affect performance of the system 10.

In this arrangement, when a plug is detected in tube 40, in addition to shutting down the flow of grain 14 into tube 40 in an attempt to prevent the plug from getting worse, as is described herein, central controller 24 may also adjust the positon of dynamic pressure relief valve 116.

Early Detection: One of the benefits of the system 10 is that it provides early detection of a plug and in view of early detection of a potential plug the system 10 can make adjustments to avoid the plug, minimize the plug and/or clear the plug. In response to this early detection, in this arrangement, central controller 24 using processor 134 and instructions 138 stored in memory 136 stops or alternatively slows down the entry of grain into air tube 40 by slowing or stopping rotary airlock 124, and/or by slowing or stopping the flow of grain 14 into rotary airlock 124 by closing a gate 156 in or along input tube 158 and/or surge bin 160 which facilitates the flow of grain 14 into rotary airlock 124, and/or by slowing or stopping the flow of gain 14 into rotary airlock 124 by slowing or stopping discharge system 82 of grain dryer 18 and/or metering system 80 of grain dryer 18 and/or slowing or stopping any other component of the system that facilities the flow of grain 14 to rotary airlock 124 and/or air system 20. This is so as to ensure that more gain 14 is not added to this potential plug, thereby making the plug worse. In addition, with the additional control provided by the addition of dynamic pressure relief valve 114 to system 10, central controller 24 quickly reacts and closes dynamic pressure relief valve 114.

By closing dynamic pressure relief valve 114 upon the early detection of a plug, central controller 24 ensures that all of the power provided by blower motor 106 is directed to clearing the potential plug in the air tube 40 or preventing the potential plug from forming into an actual plug. This has the tendency to reduce the potential for a plug to occur and fault limit "F" to be hit at point "C".

If the potential plug clears, and the air pressure drops in response thereto, central controller 24 using processor 134 and instructions 138 stored in memory 136 detects this drop in air pressure and again seeks to control the system 10 to optimum equilibrium operation again. This is accomplished again by automatically reinitiating the flow of grain into air tube 40. In doing so, central controller 24 using processor 134 and instructions 138 stored in memory 136 in an attempt to avoid another plug central controller 24 starts metering grain 14 into air tube 40 at a slow or slower initial rate. Simultaneously, central controller 24 using processor 134 and instructions 138 stored in memory 136 controls operation of dynamic pressure relief valve 114. In doing so, central controller 24 using processor 134 and instructions 138 stored in memory 136 in an attempt to avoid another plug central controller 24 initially maintains dynamic pressure relief valve 114 in a position that is closed or more-closed than during optimum continuous operation, again, so as to avoid plugging again. In this way, central controller 24 simultaneously controls the rate of flow of grain 14 into air system 20 while also controlling the amount of air pressure that is bled off using dynamic pressure relief valve 114.

In one arrangement, central controller 24 using processor 134 and instructions 138 stored in memory 136 monitors the air pressure in air tube 40 for a period of time ensuring that another plug does not occur during the initial reentry of grain 14. Central controller 24 using processor 134 and instructions 138 stored in memory 136 continues to iteratively increase the amount of grain 14 added to air tube 40 followed by periods of monitoring the air pressure in the air tube 40 until the desired air pressure range is achieved. Simultaneously, central controller 24 is used to open and/or close dynamic pressure relief valve 114. In this way, central controller 24 continuously and in real time balances the amount of grain 14 flowing into air tube 40 with the amount of air bled through dynamic pressure relief valve 114 with the air pressure within air tube 40. In one arrangement, central controller 24 iteratively continues to increase grain flow into air tube 40 while iteratively opening dynamic pressure relief valve 114 until optimum equilibrium operation is achieved.

In this way, central controller 24 controls operation of air system 20 having a dynamic pressure relief valve 114 in an optimum and maximized operation while avoiding plugs.

Unplugging Routine: In one arrangement, when a plug is detected in tube 40, central controller 24 may begin what is known as an unplugging routine.

In one arrangement, a plug is detected when the air pressure in air tube 40 and/or current draw of blower motor 106 reaches point "C" on FIGS. 5 and 6 respectively. If a plug occurs and an early detection routine was performed, as is described herein, this means the early detection process was not successful in avoiding the plug.

When central controller 24 detects a plug has occurred, central controller 24 immediately shuts down the additional flow of grain 14 into tube 40, if it wasn't already shut down. Thereafter, in one arrangement, as an initial step, central controller 24 closes the dynamic pressure relief valve 114 either partially or all the way to a fully closed position in an effort to power the plug through tube 40. In this initial step, the central controller 24 is essentially leaning on the plug with its full force in an attempt to move the plug and/or break it apart. This application of full force to the plug is performed either until the plug is cleared, until a predetermined amount of time passes and the central controller 24 determines the plug cannot be cleared by leaning on the plug, or until a fault occurs (it should be noted that in some cases it is undesirable to run the system 10 to the point where a fault occurs as this may cause wear on parts of the system 10, and hitting a fault may automatic shutting down of various components of the system 10 which require later restarting, either automatically or manually, before operation can continue).

Thereafter, central controller 24 attempts to self-clear the plug in tube 40 by opening and closing dynamic pressure relief valve 114 by electronically controlling actuator 118 which controls operation of valve body 116. In one arrangement, valve body 116 is moved in a dramatic, drastic or substantial manner, such as between a fully opened and fully closed position (or any position between a fully opened and fully closed position) so as to cause the greatest variation in air pressure applied to the plug. In one arrangement, central controller 24 pauses or maintains valve body 116 in a fully opened or fully closed manner for a predetermined amount of time to cause as substantial an impact as possible without jeopardizing blower motor 106. In one arrangement, central controller moves actuator 118 as fast as possible between the fully open and fully closed position (or any position between a fully opened and fully closed position) so as to cause the most dramatic shift in air pressure within tube 40 in the shortest amount of time or desired amount of time.

By moving valve body 116 between the fully open and fully closed position (or any position between a fully opened and fully closed position) while operating blower motor 106 at full capacity (or any other set amount) this causes a pulsing flow of air pressure to flow through tube 40. When these iterative pulses impact the plug in tube 40 these pulses have a tendency to either break the plug apart and return it to flowing material, or alternatively these pulses have a tendency to bump the plug along the length of tube 40 until the plug clears the end of tube 40 and is deposited into dry grain bin 22 (after which normal operation of the system 10 may be automatically restored).

In one arrangement, central controller 24 is configured to continue this iterative pulsing of the unplugging routine in an attempt to clear the plug for a predetermined amount of time and/or a predetermined number of cycles (or pulses). If central controller 24 is capable of automatically clearing the plug in tube 40 the central controller 24 resumes normal operation of the system 10 such as re-introducing the flow of grain 14 into tube 40, restarting grain dryer 18 and all the associated systems and motors therein, restarting input device 16 and the like.

As such, in this arrangement, central controller 24 automatically detected a plug in tube 40, automatically shut down components of the system 10 to stop the flow of grain 14 into tube 40 to prevent the plug from getting worse, automatically entered into an unplugging routine, automatically cleared the plug, automatically detected the plug was cleared, and then automatically restarted normal operation of the system 10. This is all without user intervention. This is also without jeopardizing damage to components of the system 10. During the unplugging routine, blower motor 106 is protected by fault switches and/or fault settings that shut down operation of the blower motor 106 if the temperature of blower motor 106 reaches a fault setting, if current draw of blower motor 106 reaches a fault setting, if the pressure within the air tube 40 reached a fault setting, or if any other parameter reaches a fault setting.

In the event that after a predetermined amount of time or number of cycles or attempts or a calculated amount of attempts at pulsing or bumping the plug in tube 40, central controller 24 determines it is not capable of clearing the plug in tube 40, central controller 24 shuts down operation of blower motor 106 so as to preserve blower motor 106 and to preserve energy. In concert with determining that the plug in tube 40 cannot be automatically cleared, a fault message is transmitted by central controller 24 through the internet 26, the cloud 28 and/or wireless network 30 to a user's electronic device 32 such as their desktop or laptop computer 34, their cell phone 36, their tablet 38 and/or any other device in the form of a text message, an app message, a voice message, an email, an alert, or any other message thereby informing them that a plug has occurred and operation of the system 10 has been shut down.

Figure 9:
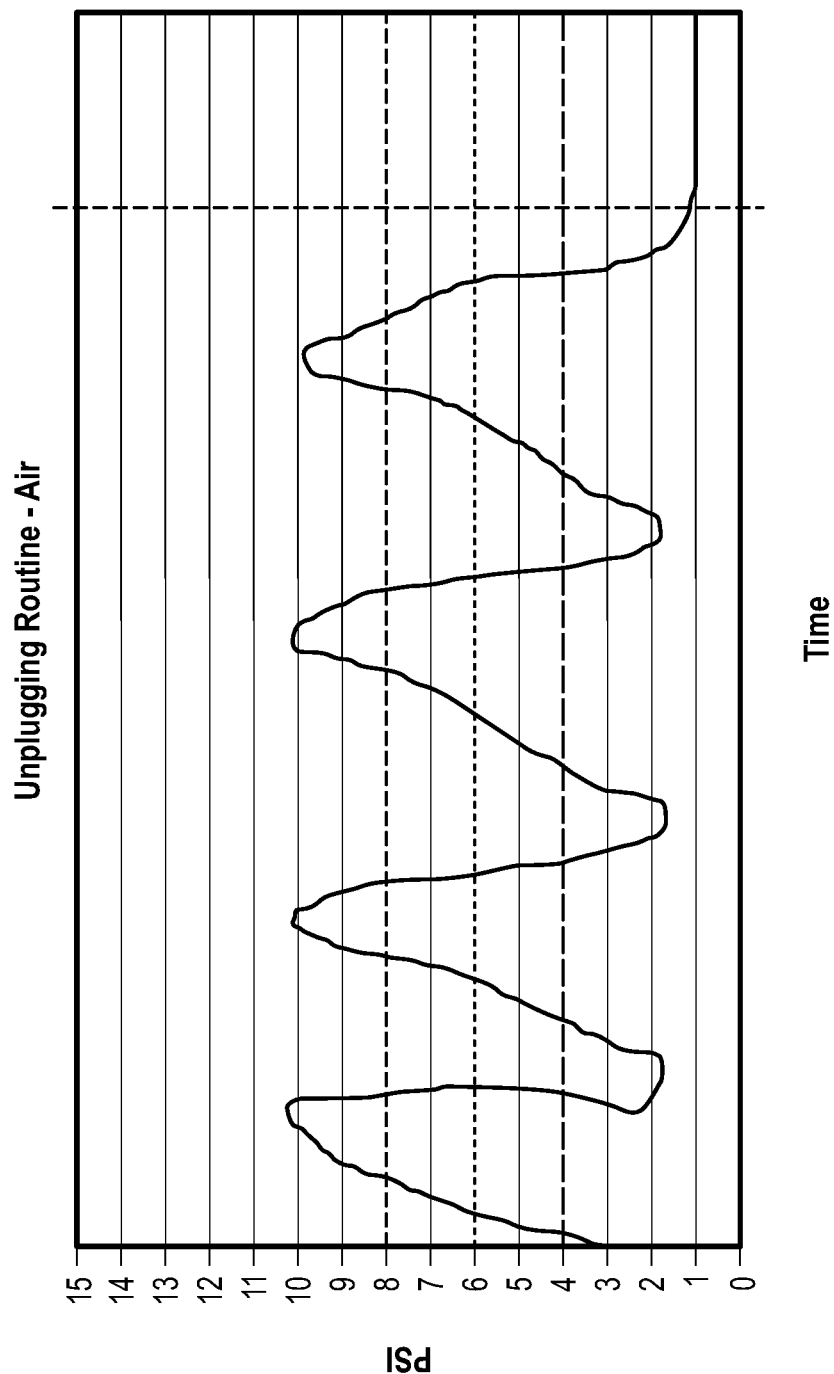
FIG. 9 is a plan view of a demonstrative chart showing air pressure during an unplugging routine as well as when a plug is cleared.
Figure 10A:
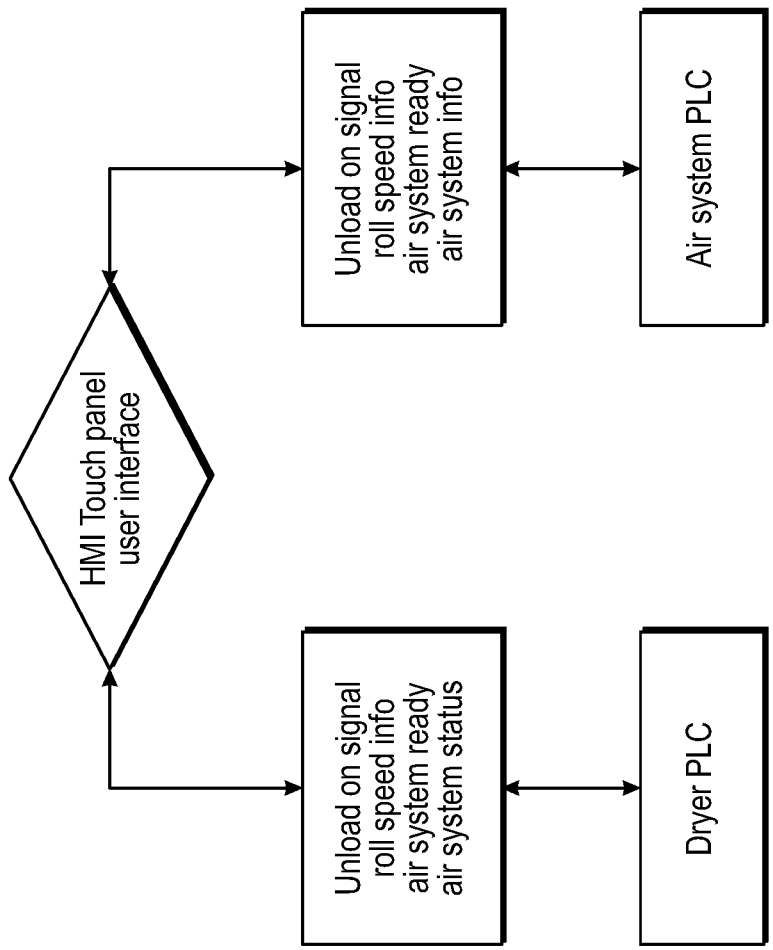
FIG. 10A is a plan view of a chart.
Figure 10B:
FIG. 10B is a sequence of steps of a typical startup sequence of the grain handling system having a central controller, a grain dryer and an air system.
Figure 11A:
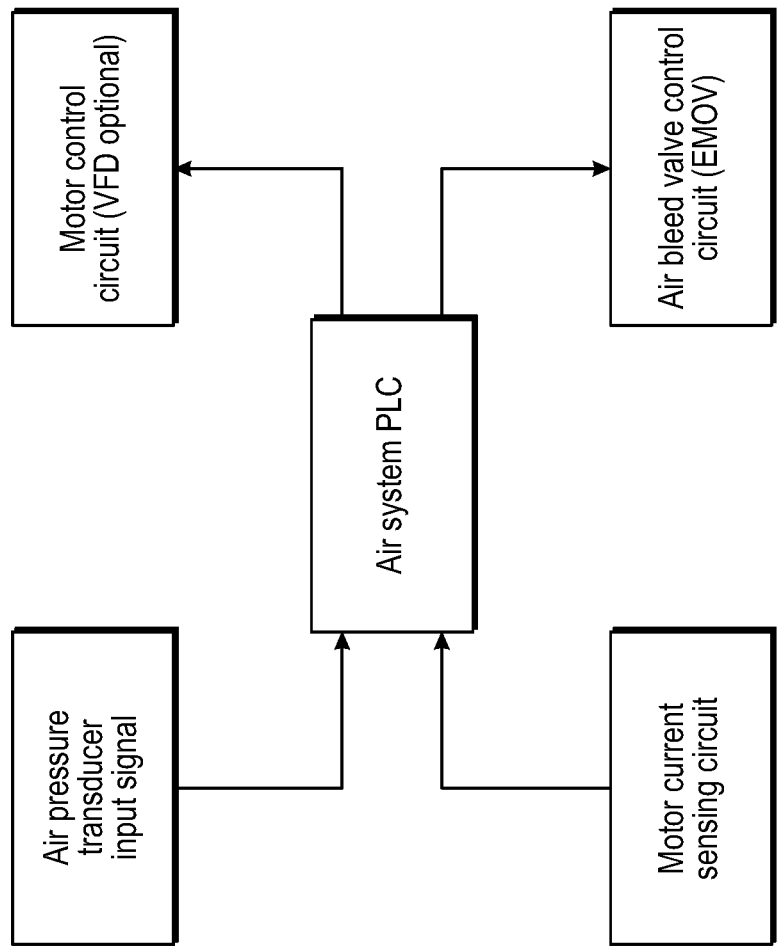
FIG. 11A is a plan view of a chart.
Figure 12A:
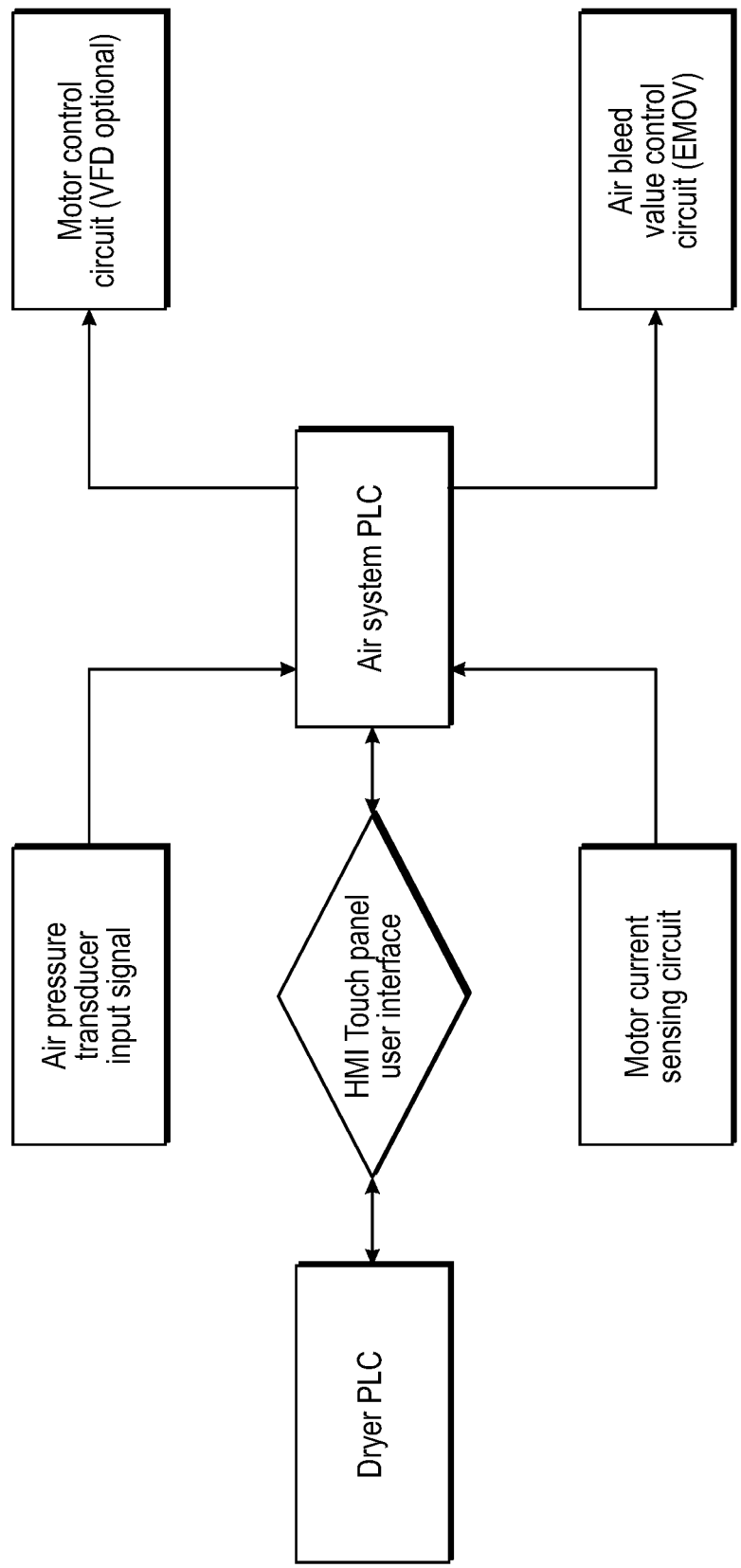
FIG. 12A is a plan view of a chart.
Figure 12C:
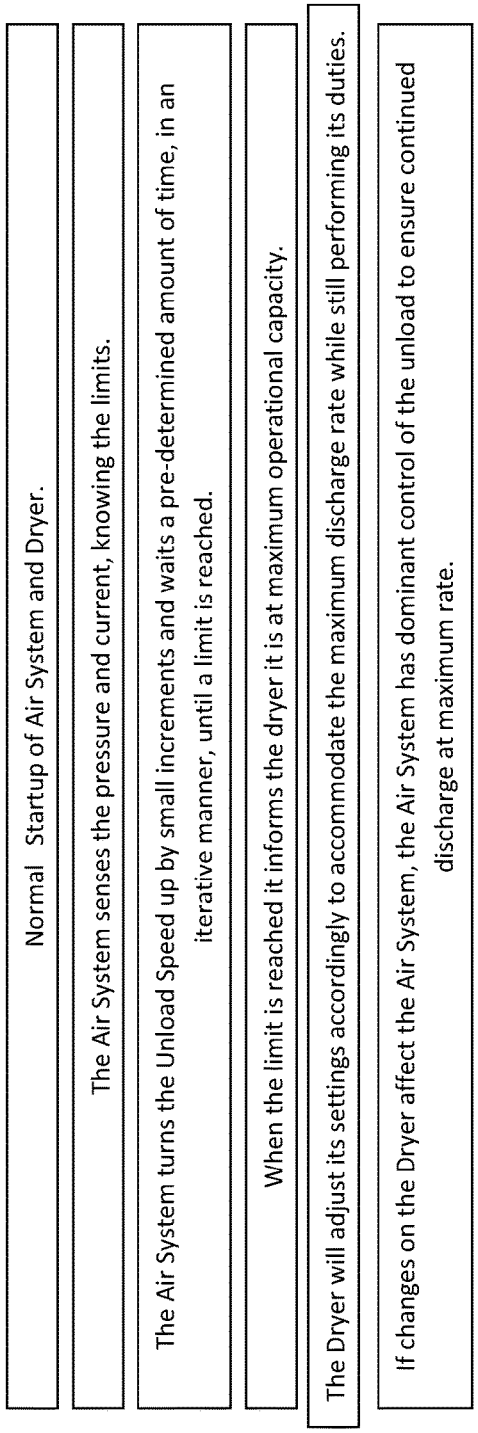
FIG. 12C is a continuation of FIG. 12A and FIG. 12B, and is a sequence of steps of a dryer unload air system maximum operation interlock which is a procedure that will control the dryer in order to maximize the throughput of the air system.
Figure 12D:
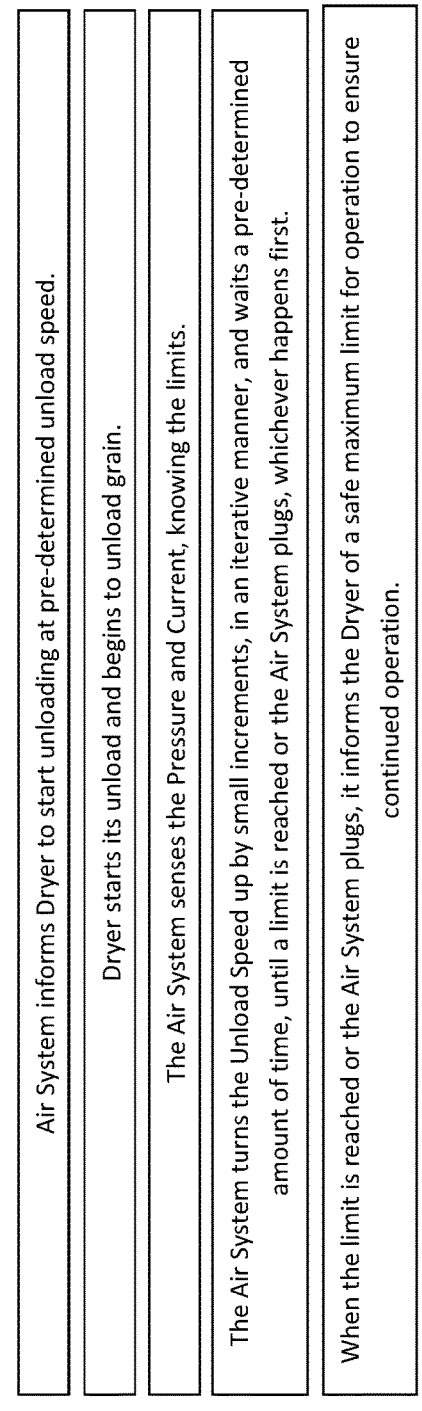
FIG. 12D is a sequence of steps of an air system automated limit finder which is a procedure that will inform the dryer of the limits of the air system.

A demonstrative graph of this unplugging routine is shown in FIG. 9. In this arrangement, the PSI within tube 40 is shown oscillating between a minimum value and a maximum value in an iterative manner until the plug is cleared. That is, in the arrangement shown, the PSI begins at a minimum level, at or around approximately two PSI corresponding to dynamic pressure relief valve 114 being fully opened where most of the air pressure from blower motor 106 is vented away. Thereafter, the PSI quickly ramps up as the dynamic pressure relief valve 114 is quickly closed. This continues until the PSI reaches a maximum amount at or around ten PSI corresponding to dynamic pressure relief valve 114 being mostly or fully closed. Thereafter, the PSI quickly ramps down as the dynamic pressure relief valve 114 is quickly opened. This process is repeated. This iterative process continues until the plug in tube 40 is cleared or broken up at or near the dashed vertical line which shows the PSI dropping to approximately one PSI.

This graph of FIG. 9 is only one of countless examples of an unplugging routine and is intended only to be demonstrative in nature. The shape of this graph may change dramatically by opening and closing the dynamic pressure relief valve 114 in different ways, keeping the dynamic pressure relief valve 114 opened or closed for shorter or longer amounts of time, or dynamically changing how the dynamic pressure relief valve 114 is opened and/or closed, all of which are hereby contemplated for use. As one example, the system 10 may "lean" on the plug for a longer period of time in hopes of clearing the plug without shorting or faulting any of the components of the system 10 which results in the peaks of the graph or curve extending laterally longer than what is shown in FIG. 9. However, again, any other shape to the graph may be achieved and therefore is hereby contemplated for use.

It is worthwhile to note, that in this arrangement, system 10 does not have a variable frequency drive 140 and therefore the central controller 24 is unable to adjust the speed of blower motor 106 other than shutting blower motor 106 off. As such, the unplugging routine is performed essentially exclusively through the operation of dynamic pressure relief valve 114.

In Operation—System with Variable Frequency Drive and no Dynamic Pressure Relief Valve:

In this example of operating grain handling system 10, grain handling system includes an input device 16, a grain dryer 18, an air system 20 and a variable frequency drive 140 and does not include a dynamic pressure relief valve 114. In this example, the level of operation of blower motor 106 may be varied by variable frequency drive 140. In this example, with the addition of a variable frequency drive 140, all of the operational teachings presented above with respect to a system 10 only a dynamic pressure relief valve 114 as well as with respect to a system 10 without either a dynamic pressure relief valve 114 or a variable frequency drive 140 apply with the added ability to adjust the speed of blower motor 106 using variable frequency drive 140. That is, all prior teaching herein is incorporated into and applicable to this example as well as the further teaching presented below.

In this arrangement, the speed of blower motor 106 is adjusted to provide the desired amount of air pressure within tube 40. As such, dynamic pressure relief valve 114 is not needed to bleed off excessive air pressure as the blower motor 106 is operated at the desired level to generate the desired air pressure and therefore there is no need to bleed off excess air pressure. While the inclusion of a variable frequency drive 140 increases the initial price of the system 10 and increases the complexity of the system 10, over time the inclusion of variable frequency drive 140 reduces cost by reducing power consumption and increasing the efficiency of operation of the system 10. In addition, the elimination of the dynamic pressure relief valve 114 reduces initial cost and complexity of the system 10.

In this arrangement, central controller 24 receives signals regarding the operation of the system 10 from some or all of sensors identified above in the system 10 with the manual pressure relief valve 108.

In this arrangement, during operation of the system 10, central controller 24 tracks air pressure in tube 40 through pressure sensor 122 as well as current draw of blower motor 106 through current sensor 144, as well as any other information from any other sensor or component of the system 10.

In this arrangement, in response to the information received by central controller 24, using processor 134 and instructions 138 stored in memory 136, central controller 24 in concert with variable frequency drive 140 precisely adjust the speed of operation and/or output of blower motor 106. In this way, blower motor 106, using variable frequency drive 140, is operated to provide the desired air pressure within tube 40, not more and not less. In doing so, the level of operation of blower motor 106 is reported back to central controller 24 and/or variable frequency drive 140 in a feedback loop using pressure sensor 122, current sensor 144, motor speed sensor 146, grain speed sensor 148 and/or any other sensor. In this way, and with this feedback loop of continuous pressure information and operation information, central controller 24 in concert with variable frequency drive 140 may adjust the level of operation of blower motor 106. In this way, system 10 with the addition of variable frequency drive 140, central controller 24 may adjust for varying factors (such as changes in humidity, outside air temperature, moisture content of grain 14, temperature of grain 14, debris or fines content in grain 14, the rate at which grain 14 is added to tube 40, the consistency or variability at which grain 14 is added to tube 40, weight of grain 14, size of grain 14, or any other variable) that affect performance of the system 10.

Figure 8:
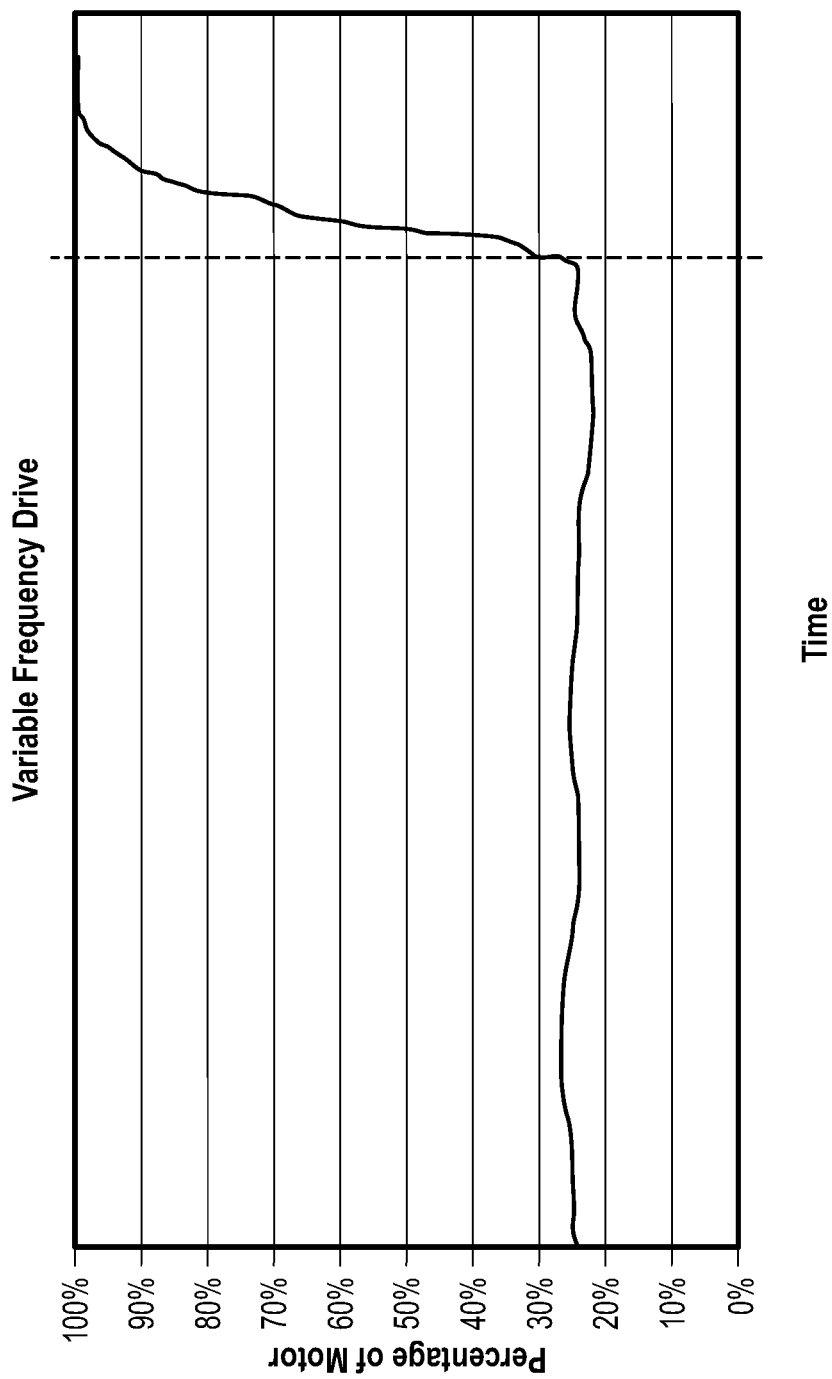
FIG. 8 is a plan view of a demonstrative chart showing operation of a variable frequency drive which operates a blower motor in normal operation as well as when a plug occurs and an unplugging routine is implemented.

The result of using variable frequency drive 140 is that blower motor 106 tends to operate at a substantially reduced speed, at a substantially reduced load, while consuming substantially less energy, and while enduring substantially less wear and tear. With reference to FIG. 8, a demonstrative graph is shown which shows the level of operation of blower motor 106 substantially below the maximum capacity. That is, until a plug is detected, which is shown at approximately the vertical dashed line, and thereafter blower motor 106 is ramped up to full capacity.

Early Detection: As is described herein, when a plug is detected, or early detection indicates that a plug may be forming, central controller 24 stops the flow of grain 14 into tube 40 to prevent the plug from getting worse, and central controller 24 through the use of variable frequency drive 140 ramps up operation of blower motor 106 to full or near full output.

By ramping up operation of blower motor 106 upon the early detection of a plug, central controller 24 ensures that full power of blower motor 106 is applied to clearing the potential plug in the air tube 40 or preventing the potential plug from forming into an actual plug. This has the tendency to reduce the potential for a plug to occur and fault limit "F" to be hit at point "C".

If the potential plug clears, and the air pressure drops in response thereto, central controller 24 using processor 134 and instructions 138 stored in memory 136 detects this drop in air pressure and again seeks to control the system 10 to optimum equilibrium operation again. This is accomplished again by automatically reinitiating the flow of grain into air tube 40. In doing so, central controller 24 using processor 134 and instructions 138 stored in memory 136 in an attempt to avoid another plug central controller 24 starts metering grain 14 into air tube 40 at a slow or slower initial rate. Simultaneously, central controller 24 using processor 134 and instructions 138 stored in memory 136 controls operation of variable frequency drive 140 to control operation of blower motor 106. In doing so, central controller 24 using processor 134 and instructions 138 stored in memory 136 in an attempt to avoid another plug central controller 24 initially maintains operation of blower motor 106 at an elevated output or slightly elevated output as compared to normal optimum continuous operation, again, so as to avoid plugging again. In this way, central controller 24 simultaneously controls the rate of flow of grain 14 into air system 20 while also controlling the operation of variable frequency drive 140 to control operation of blower motor 106.

In one arrangement, central controller 24 using processor 134 and instructions 138 stored in memory 136 monitors the air pressure in air tube 40 for a period of time ensuring that another plug does not occur during the initial reentry of grain 14. Central controller 24 using processor 134 and instructions 138 stored in memory 136 continues to iteratively increase the amount of grain 14 added to air tube 40 followed by periods of monitoring the air pressure in the air tube 40 until the desired air pressure range is achieved. Simultaneously, central controller 24 is used to adjust the speed of blower motor 106 using variable frequency drive 140. In this way, central controller 24 continuously and in real time balances the amount of grain 14 flowing into air tube 40 with the output of blower motor 106. In one arrangement, central controller 24 iteratively continues to increase grain flow into air tube 40 while iteratively reducing output of blower motor 106 until optimum equilibrium operation is achieved.

In this way, central controller 24 controls operation of air system 20 having a variable frequency drive 140 to control operation of blower motor 106 in an optimum and maximized operation while avoiding plugs.

Unplugging Routine: In one arrangement, when a plug is detected in tube 40, central controller 24 may begin what is known as an unplugging routine.

In one arrangement, a plug is detected when the air pressure in air tube 40 and/or current draw of blower motor 106 reaches point "C" on FIGS. 5 and 6 respectively. If a plug occurs and an early detection routine was performed, as is described herein, this means the early detection process was not successful in avoiding the plug.

In this arrangement, when a plug is detected in tube 40, in addition to shutting down the flow of grain 14 into tube 40, it that wasn't already done, in an attempt to prevent the plug from getting worse as is described herein, central controller 24 may also adjust the operation of blower motor 106 through the variable frequency drive 140.

Thereafter, in one arrangement, as an initial step, central controller 24 ramps up operation of blower motor 106 using variable frequency drive 140 to full output or near full output in an effort to apply full pressure to the plug and power the plug through tube 40. In this initial step, the central controller 24 is essentially leaning on the plug with its full force in an attempt to move the plug and/or break it apart. This application of full force to the plug is performed either until the plug is cleared, until a predetermined amount of time passes and the central controller 24 determines the plug cannot be cleared by leaning on the plug, or until a fault occurs (it should be noted that in some cases it is undesirable to run the system 10 to the point where a fault occurs as this may cause wear on parts of the system 10, and hitting a fault may automatic shutting down of various components of the system 10 which require later restarting, either automatically or manually, before operation can continue).

In one arrangement, when a plug is detected in tube 40, that cannot be cleared by ramping up output of blower motor 106, central controller 24 may begin what is known as an unplugging routine. That is, when central controller 24 detects a plug has occurred, central controller 24 immediately shuts down the additional flow of grain 14 into tube 40, if that wasn't already done already. Thereafter, central controller 24 in concert with variable frequency drive 140 attempts to self-clear the plug in tube 40 by ramping up operation of blower motor 106 to full or almost full capacity for a predetermined or calculated amount of time. In doing so, the plug is exposed to increased or maximum air pressure, which has a tendency to clear the plug. Thereafter, if the plug is not cleared, central controller 24 in concert with variable frequency drive 140, ramps down the operation of blower motor 106 thereby reducing the output of blower motor 106 and reducing the air pressure experienced by the plug for a predetermined amount of time or a calculated amount of time. Thereafter, if the plug is not cleared, central controller 24 in concert with variable frequency drive 140 again ramps up operation of blower motor 106 to full or almost full capacity for a predetermined or calculated amount of time. Again, exposing the plug to increased or maximum air pressure, which has a tendency to clear the plug.

In this way, using central controller 24 in concert with variable frequency drive 140 to ramp up and ramp down operation of blower motor 106 this causes a pulsing flow of air pressure to flow through tube 40. When these iterative pulses impact the plug in tube 40 these pulses have a tendency to either break the plug apart and return it to flowing material, or alternatively these pulses have a tendency to bump the plug along the length of tube 40 until the plug clears the end of tube 40 and is deposited into dry grain bin 22.

In one arrangement, central controller 24 is configured to continue this iterative pulsing of the unplugging routine in an attempt to clear the plug for a predetermined amount of time. If central controller 24 is capable of automatically clearing the plug in tube 40 the central controller 24 resumes normal operation of the system 10 such as re-introducing the flow of grain 14 into tube 40, restarting grain dryer 18 and all the associated systems and motors therein, restarting input device 16 and the like. Notably, in this arrangement, with the use of variable frequency drive 140, when the plug is cleared, central controller 24 resumes normal operation by reducing the output of blower motor 106 using variable frequency drive 140 to the desired level of air pressure within tube 40.

As such, in this arrangement, central controller 24 automatically detected a plug in tube 40, automatically shut down components of the system 10 to stop the flow of grain 14 into tube 40 to prevent the plug from getting worse, automatically entered into an unplugging routine, automatically cleared the plug, automatically detected the plug was cleared, and then automatically restarted normal operation of the system 10. This is all without user intervention. This is also without jeopardizing damage to components of the system 10.

In the event that after a predetermined number of attempts or a calculated amount of attempts at pulsing or bumping the plug in tube 40, central controller 24 determines it is not capable of clearing the plug in tube 40, central controller 24 shuts down operation of blower motor 106 so as to preserve blower motor 106 and to preserve energy. In concert with determining that the plug in tube 40 cannot be automatically cleared, a fault message is transmitted by central controller 24 through the internet 26, the cloud 28 and/or wireless network 30 to a user's electronic device 32 such as their desktop or laptop computer 34, their cell phone 36, their tablet 38 and/or any other device in the form of a text message, a voice message, an email, an alert, or any other message thereby informing them that a plug has occurred and operation of the system 10 has been shut down.

The resulting effect on PSI of this unplugging routine using variable frequency drive 140 may be similar to the graph shown in FIG. 9, however it is contemplated that the effect on air pressure when using variable frequency drive 140 to ramp up and ramp down blower motor 106 may be attenuated or smoother or slower than when compared to using dynamic pressure relief valve 114 due to the amount of time it may take to ramp up and ramp down blower motor 106 and the inability to dynamically and automatically bleed air pressure from tube 40.

This graph of FIG. 9 is only one of countless examples of an unplugging routine and is intended only to be demonstrative in nature. The shape of this graph may change dramatically by the manner in which blower motor 106 is operated by central controller 24 in concert with variable frequency drive 140.

It is worthwhile to note, that in this arrangement, system 10 does not have a dynamic pressure relief valve 114 and therefore the central controller 24 is unable selectively bleed air pressure from tube 40. As such, the unplugging routine is performed essentially exclusively through the operation of blower motor 106 through central controller 24 and variable frequency drive 140.

In Operation—System with Variable Frequency Drive and Dynamic Pressure Relief Valve:

In this example of operating grain handling system 10, grain handling system 10 includes an input device 16, a grain dryer 18, an air system 20 and a variable frequency drive 140 and a dynamic pressure relief valve 114. In this example, with the addition of a variable frequency drive 140 as well as dynamic pressure relief valve 114, all of the operational teachings presented above with respect to a system 10 only a dynamic pressure relief valve 114, only a variable frequency drive 140, as well as with respect to a system 10 without either a dynamic pressure relief valve 114 or a variable frequency drive 140 apply with the added ability to adjust the speed of blower motor 106 using variable frequency drive 140 as well as adjust the position of the dynamic pressure relief valve 114. That is, all prior teaching herein is incorporated into and applicable to this example as well as the further teaching presented below.

It is counterintuitive to provide a grain handling system 10 having both a dynamic pressure relief valve 114 as well as a variable frequency drive 140. This is because, both the dynamic pressure relief valve 114 as well as a variable frequency drive 140 are configured to provide the same result, that is, to reduce air pressure within tube 40 to a desired level. However, these two devices accomplish this same result in completely different ways.

That is, the use of a variable frequency drive 140 is essentially a more elegant solution. The variable frequency drive 140 is more sophisticated, more expensive initially and increases complexity of the system 10. However, the use of variable frequency drive 140 allows for precise control of blower motor 106 such that the blower motor 106 provides the exact desired air pressure through tube 40, not more and not less. In doing so, the use of variable frequency drive 140 reduces the operating cost of system 10 by reducing the power consumed by blower motor 106 to only that which is truly needed. The use of a variable frequency drive 140 can also reduce the wear and tear on blower motor 106 and increase the longevity of the system 10.

In contrast, the use of a dynamic pressure relief valve 114 is essentially a crude or rough but highly effective solution. In this arrangement, the blower motor 106 is essentially continuously operated at maximum or near maximum capacity and then dynamic pressure relief valve 114 is used to bleed off any extra air pressure or air flow. This causes the consumption of excess energy by blower motor 106 (which is essentially bled-off) and can cause excess wear and tear on blower motor 106 and other components of the system 10. However, the use of dynamic pressure relief valve 114 is highly effective and robust, albeit crude. In addition, the use of dynamic pressure relief valve 114 is initially less expensive than using a variable frequency drive 140.

As variable frequency drive 140 and dynamic pressure relief valve 114 essentially perform the same function there is essentially no reason to assembly a grain handling system 10 that includes both variable frequency drive 140 and dynamic pressure relief valve 114. To do so would excessively and unnecessarily increase cost and complexity of the resulting grain handling system 10 without providing any functional advantages.

However, in this example, the combination of variable frequency drive 140 and dynamic pressure relief valve 114 in a single grain handling system 10 provides the benefits of running the blower motor 106 at a reduced output during normal operation. During normal operation, essentially dynamic pressure relief valve 114 is not used.

Early Detection: As is described herein, when a plug is detected, or early detection indicates that a plug may be forming, central controller 24 stops the flow of grain 14 into tube 40 to prevent the plug from getting worse, and central controller 24 through the use of variable frequency drive 140 ramps up operation of blower motor 106 to full or near full output while ensuring that dynamic pressure relief valve 114 is closed.

By ramping up operation of blower motor 106 and ensuring dynamic pressure relief valve 114 is closed upon the early detection of a plug, central controller 24 ensures that full power of blower motor 106 is applied to clearing the potential plug in the air tube 40 or preventing the potential plug from forming into an actual plug. This has the tendency to reduce the potential for a plug to occur and fault limit "F" to be hit at point "C".

If the potential plug clears, and the air pressure drops in response thereto, central controller 24 using processor 134 and instructions 138 stored in memory 136 detects this drop in air pressure and again seeks to control the system 10 to optimum equilibrium operation again. This is accomplished again by automatically reinitiating the flow of grain into air tube 40. In doing so, central controller 24 using processor 134 and instructions 138 stored in memory 136 in an attempt to avoid another plug central controller 24 starts metering grain 14 into air tube 40 at a slow or slower initial rate. Simultaneously, central controller 24 using processor 134 and instructions 138 stored in memory 136 controls operation of variable frequency drive 140 to control operation of blower motor 106 as well as dynamic pressure relief valve 114. In doing so, central controller 24 using processor 134 and instructions 138 stored in memory 136 in an attempt to avoid another plug central controller 24 initially maintains operation of blower motor 106 at an elevated output or slightly elevated output as compared to normal optimum continuous operation. During this time, in one arrangement, central controller 24 controls dynamic pressure relief valve 114 to remain closed. This is so as to avoid plugging again. In this way, central controller 24 simultaneously controls the rate of flow of grain 14 into air system 20 while also controlling the operation of variable frequency drive 140 to control operation of blower motor 106 as well as dynamic pressure relief valve 114.

In one arrangement, central controller 24 using processor 134 and instructions 138 stored in memory 136 monitors the air pressure in air tube 40 for a period of time ensuring that another plug does not occur during the initial reentry of grain 14. Central controller 24 using processor 134 and instructions 138 stored in memory 136 continues to iteratively increase the amount of grain 14 added to air tube 40 followed by periods of monitoring the air pressure in the air tube 40 until the desired air pressure range is achieved. Simultaneously, central controller 24 is used to adjust the speed of blower motor 106 using variable frequency drive 140 and/or adjust the position of dynamic pressure relief valve 114. In this way, central controller 24 continuously and in real time balances the amount of grain 14 flowing into air tube 40 with the output of blower motor 106 as well as the position of dynamic pressure relief valve 114. In one arrangement, central controller 24 iteratively continues to increase grain flow into air tube 40 while iteratively reducing output of blower motor 106 until optimum equilibrium operation is achieved while maintaining dynamic pressure relief valve 114 in a closed position.

In this way, central controller 24 controls operation of air system 20 having a variable frequency drive 140 to control operation of blower motor 106 in an optimum and maximized operation while avoiding plugs while maintaining dynamic pressure relief valve 114 in a closed position.

Unplugging Routine: In one arrangement, when a plug is detected in tube 40, central controller 24 may begin what is known as an unplugging routine.

Then, when a plug is detected, variable frequency drive 140 is used to ramp up the output of blower motor 106 to provide maximum power, maximum air flow and maximum air pressure. Then, when a plug is detected, and the blower motor 106 has been ramped up to full capacity or near full capacity by central controller 24 using variable frequency drive 140, dynamic pressure relief valve 114 and actuator 118 is used to perform an unplugging routine, as is described herein. That is, dynamic pressure relief valve 114 and actuator 118 is used oscillate valve body 116 between a fully open position and a fully closed (or any position there between) as is described herein. This causes pulses of air flow to impact the plug either breaking the plug apart or bumping the plug along tube 40 until it clears as is described herein.

Once the plug is cleared, central controller 24 resumes normal operation by closing dynamic pressure relief valve 114 and controlling the output of blower motor 106 using variable frequency drive 140 to the precise desired output which obviates the need for venting through dynamic pressure relief valve 114.

In this way, the combination of central controller 24, sensors 120, 122, 144, 146, 148 and 150 (among others) dynamic pressure relief valve 114 and actuator 118 are used to provide new and never before available functionality of automatically detecting and clearing a plug in an air system 20 while operating the air system 20 with optimum efficiency during normal operation.

Notice to User:

In one arrangement, when an early detection routine occurs, and/or an unplugging routine occurs, notice is sent to a user by central controller 24 by sending a message to the user's electronic device 32.

Static v. Dynamic Rotary Air Valve & Surge Bin:

Static Operation: In one arrangement, rotary airlock 124 operates at a generally constant speed. That is, the motor of rotary air lock 124 operates in a generally binary manner, either on or off, operating or not-operating, and/or the speed at which the vanes within rotary airlock 124 rotate at a generally constant equilibrium speed. In one arrangement, central controller 24 controls this binary operation of rotary air lock 124. In this arrangement, the amount of grain 14 that enters air system 20 is varied by a varying operation of a mechanism that inputs grain 14 into airlock 124 such as a gate 156 in or along input tube 158 and/or surge bin 160 which facilitates the flow of grain 14 into rotary airlock 124, and/or by varying operation of the discharge system 82 of grain dryer 18 and/or metering system 80 of grain dryer 18, and/or by varying operation of any other component of the system that facilities the flow of grain 14 to rotary airlock 124 and/or air system 20. In this arrangement, rotary airlock 124 operates at a relatively constant, maximum, and/or equilibrium speed while the input of grain 14 into rotary airlock 124 is varied by central controller 24 to provide the optimum amount of grain 14 at any given moment depending upon the operational characteristics of the system 10 at that time.

Dynamic Operation: In an alternative arrangement, the speed at which rotary airlock 124 operates is dynamic in nature. That is, the motor of rotary air lock 124 operates in a generally variable and/or dynamic manner, meaning it may be sped up or slowed down, and/or the speed at which the vanes within rotary airlock 124 rotate at a variable speed. In one arrangement, central controller 24 controls this variable operation of rotary air lock 124. In this arrangement, the amount of grain 14 that enters air system 20 may be varied by varying operation of the rotary airlock 124. Further variance may also be achieved by also varying operation of a mechanism that inputs grain 14 into airlock 124 such as a gate 156 in or along input tube 158 and/or surge bin 160 which facilitates the flow of grain 14 into rotary airlock 124, and/or by varying operation of the discharge system 82 of grain dryer 18 and/or metering system 80 of grain dryer 18, and/or by varying operation of any other component of the system that facilities the flow of grain 14 to rotary airlock 124 and/or air system 20. In this arrangement, rotary airlock 124 may operate at a variable speed. When the input side of rotary airlock 124 is full with grain 14, to increase the flow of grain 14 into air system 20 operation of the rotary airlock 124 is sped up by central controller 24. When the input side of rotary airlock 124 is full with grain 14, to reduce the flow of grain 14 into air system 20 operation of the rotary airlock 124 is slowed down by central controller. In this way, a dynamic rotary airlock 124 is controlled by central controller 24 to provide the optimum amount of grain 14 at any given moment depending upon the operational characteristics of the system 10. Further variance may also be achieved by central controller 24 varying the flow of grain 14 to rotary airlock 124 by dynamically controlling operation of an input mechanism.

Surge Bin: In one arrangement, a surge bin 160 is placed upstream of rotary airlock 124. Surge bin 160 is formed of any suitable size, shape and design and is configured to receive and temporarily hold an amount of grain 14 which is to be supplied to rotary airlock 124. The in the arrangement shown, in FIG. 1, surge bin 160 is placed between grain dryer 18 and rotary airlock 124. This placement provides some flexibility and give in the operation of system 10 as surge bin 160 receives grain 14 coming out of grain dryer 18, temporarily holds this grain 14, and then provides this grain 14 on demand to rotary airlock 124. This temporary grain storage between rotary airlock 124 and grain dryer 18 allows for smoother equilibrium operation of grain dryer 18 as well as air system 20.

That is, during operation of system 10, grain 14 flowing out of grain dryer 18 is temporarily held in surge bin 160. This grain 14 is drawn out of surge bin 160 by operation of a metering system, gate or other device that controls the outflow of grain 14 from surge bin 18, such as gate 156. When grain dryer 18 is discharging grain 14 faster than air system 20 can consume the grain 14, grain 14 piles up in surge bin 160. When air system 20 is consuming grain 14 faster than grain dryer 18 is discharging grain 14, grain 14 is drained from surge bin 160.

The amount of grain 14 held in surge bin 160 is sensed by sensors 162. This information is transmitted to central controller 24. Central controller 24 controls the operational characteristics of grain dryer 18 as well as air system 20 based on this information, as well as other inputs of the system 10. Based on this information, central controller 24 may smoothly and proactively control operation of the grain dryer 18, air system 20 and other components of the system 10 in a more-constant and equilibrium manner which reduces the need to shut down components of the system 10.

That is, when a plug is detected in air tube 40, central controller 24 may close gate 156 thereby stopping the flow of grain 14 into rotary airlock 124. When this occurs, grain 14 piles up within surge bin 162 while the central controller 24 attempts to clear the plug. If the surge bin 160 fills before the plug is cleared, a limit switch is triggered and/or a sensor 162 is triggered and the flow of grain 14 into the surge bin 160 is stopped, such as by shutting down operation of the grain dryer 18. However, this is undesirable as this requires restarting the grain dryer 18 and inevitably requires reestablishing equilibrium of operation of the grain dryer 18 once the plug is cleared.

In contrast, if the plug is cleared before the surge bin 160 fills, the central controller 24 reinitiates the flow of grain 14 into the rotary airlock 124 once the plug is cleared. This allows continued and uninterrupted operation of the grain dryer 18 despite stopping the flow of grain 18 into the air system 20. In this arrangement, the presence of an on demand inventory of grain 14, and storage of grain 14, at the input of rotary airlock 124 and output of grain dryer 18 reduces the need to stop operation of the grain dryer 18 when operational changes occur to the air system 20.

Also, when changes occur to the operational characteristic of air system 20, the presence of an on demand inventory of grain 14, and storage of grain 14, at the input of rotary airlock 124 and output of grain dryer 18 gives central controller 24 time to adjust the operational characteristics of grain dryer 18 and/or air system 20, and/or other components of the system 10 to help seek a new equilibrium. That is, this on demand inventory of grain 14, and storage of grain 14, at the input of rotary airlock 124 and output of grain dryer 18 gives central controller 24 time to slowly and smoothly adjust operation of the entire system 10 to seek a new equilibrium. This avoids the need to abruptly react and shutdown components of the system 10, which is an improvement over the prior art.

From the above discussion it will be appreciated that the air system and method of control presented herein improves upon the state of the art and that some, if not all, of the objectives have been met.

Specifically, the air system and method of control presented herein: reduces plugging of the air system; automatically detects plugging of the air system; automatically clears plugs in the air system; automatically detects plugs in the air system; automatically shuts down the flow of grain into the air system when a plug is detected; minimizes a plug in the air system when the plug is detected; is capable of clearing a plug and resuming normal operation automatically and without manual intervention; that is more robust than existing air systems; that reduces the cost of operating air systems; that reduces the labor related to operating air systems; that makes air systems more desirable; that optimally controls operation of the air system; that reduces the potential for catastrophic occurrences; that increases the up-time of air systems; that reduces the down-time of air systems; provides new functionality for air systems; improves the safety of using air systems; is easy to use; has a robust design; works effectively; saves time; is efficient to use; has a long useful life; protects the quality of the grain; is durable; is relatively inexpensive; is high quality; can be used with practically any grain handling system; and makes it easier to handle grain, among countless other advantages and improvements.

It will be appreciated by those skilled in the art that other various modifications could be made to the device without parting from the spirit and scope of this disclosure. All such modifications and changes fall within the scope of the claims and are intended to be covered thereby.

What is claimed:

1. A grain handling system, comprising:
a tube;
a source of grain;
the source of grain operatively connected to the tube and configured to provide grain to the tube;
a blower motor;
the blower motor operatively connected to the tube and configured to provide pressurized air to the tube and thereby cause grain to be transported through the tube by air movement through the tube;
wherein the blower motor is configured to operate at a higher speed and at a lower speed;
a pressure relief valve;
the pressure relief valve configured to bleed air pressure from the tube when in an open position;
an actuator;
the actuator configured to control operation of the pressure relief valve;
a controller;
wherein the controller is configured to detect when a plug in the tube has occurred;
wherein when the controller detects that a plug has occurred the controller is configured to automatically begin an unplugging routine;
wherein the unplugging routine includes causing the blower motor to increase from the lower speed to the higher speed and while operating the blower motor at the higher speed moving the pressure relief valve between the open position and a closed position using the actuator thereby causing surges in air pressure in the tube.

2. The system of claim 1, wherein the pressure relief valve is movable to an—infinite number of positions between the open position and the closed position.

3. The system of claim 1, wherein the controller is configured to detect when a plug in the tube has occurred by an increase in air pressure in the tube.

4. The system of claim 1, wherein when the controller detects when a plug has occurred, the controller is configured to stop the flow of grain into the tube from the source of grain.

5. The system of claim 1, wherein the pressure relief valve is an electronically controlled dynamic pressure relief valve.

6. The system of claim 1, further comprising a manual pressure relief valve operatively connected to the tube.

7. The system of claim 1, further comprising a variable frequency drive operatively connected to the blower motor; and
wherein the unplugging routine includes causing the variable frequency drive to increase operating speed of blower motor from the lower speed to the higher speed.

8. A grain handling system, comprising:
a tube;
a source of grain;
the source of grain operatively connected to the tube and configured to provide grain to the tube;
a blower motor;
the blower motor operatively connected to the tube and configured to provide pressurized air to the tube and thereby cause grain to be transported through the tube by air movement through the tube;
a pressure relief valve;
the pressure relief valve configured to move between an open position and a closed position;
the pressure relief valve configured to bleed air pressure from the tube when in the open position;
an actuator;
the actuator configured to control operation of the pressure relief valve;
a controller;
wherein when the controller detects that a plug has occurred the controller is configured to automatically begin an unplugging routine;
wherein the controller is configured to detect when a plug in the tube has occurred;
wherein the unplugging routine includes causing the actuator to iteratively move the pressure relief valve between the open position and the closed position while operating the blower motor to causing surges in air pressure in the tube.

9. The system of claim 8, wherein the unplugging routine causes the surges in air pressure in the tube by ramping up operating speed of the blower motor while causing the actuator to iteratively move the pressure relief valve between the open position and the closed position.

10. The system of claim 8, wherein the pressure relief valve is movable to an infinite number of positions between the open position and the closed position.

11. The system of claim 8, wherein the controller is configured to detect when a plug in the tube has occurred by an increase in air pressure in the tube.

12. The system of claim 8, wherein when the controller detects when a plug has occurred the controller is configured to stop the flow of grain into the tube from the source of grain.

13. The system of claim 8, wherein the pressure relief valve is an electronically controlled dynamic pressure relief valve.

14. The system of claim 8, further comprising a manual pressure relief valve operatively connected to the tube.

15. The system of claim 8, further comprising a variable frequency drive operatively connected to the blower motor; and
wherein the unplugging routine includes causing the variable frequency drive to increase operating speed of blower motor from the lower speed to the higher speed.

16. A grain handling system, comprising:
a tube;
a source of grain;
the source of grain operatively connected to the tube and configured to provide grain to the tube;
a blower motor;
the blower motor operatively connected to the tube and configured to provide pressurized air to the tube and thereby cause grain to be transported through the tube by air movement through the tube;
a pressure relief valve;
the pressure relief valve configured to move between an open position and a closed position;
the pressure relief valve configured to bleed air pressure from the tube when in the open position;
an actuator;
the actuator configured to control operation of the pressure relief valve;
a controller;
wherein when the controller detects that a plug has occurred the controller is configured to automatically begin an unplugging routine;
wherein the controller is configured to detect when a plug in e tube has occurred;
wherein the unplugging routine includes causing the actuator to iteratively move the pressure relief valve between the pen position and the closed position while operating the blower motor to causing surges in air pressure in the tube;
wherein the unplugging routine causes the surges in air pressure in the tube by causing the blower motor to iteratively turn on and off while causing the actuator to iteratively move the pressure relief valve between the open position and the closed position.

17. A method of controlling a grain handling system, the steps comprising:
providing a blower motor, a pressure relief valve, an actuator operatively connected to the pressure relief valve, and a controller operatively connected to the blower motor and the actuator of the pressure relief valve;
blowing pressurized air into a tube by the blower motor;
providing grain into the tube from a source of grain;
transporting grain through the tube by air movement through the tube;
detecting when a plug has occurred in the tube by the controller;
initiating an unplugging routine by the controller in response to detecting a plug has occurred by ramping up output of the blower motor while moving the pressure relief valve between an open position and a closed position using the actuator thereby causing surges in air pressure in the tube.

18. The method of claim 17, further comprising the step of stopping the flow of grain into the tube by the controller in response to detecting a plug has occurred.

19. The method of claim 17, further comprising the step of detecting when the plug has cleared and, in response, resuming normal operation.

20. The method of claim 17, further comprising the step of detecting when the plug has cleared and, in response, optimizing output of the blower motor.

21. The method of claim 17, further comprising the step of detecting when the plug has cleared and, in response, reducing output of the blower motor to an optimum level.

22. The method of claim 17, further comprising the step of detecting when the plug has cleared and in response reinitiating the flow of grain into the tube by the controller.

23. The method of claim 17, wherein ramping up output of the blower motor includes operating the blower motor at full power.

24. The method of claim 17, wherein the pressure relief valve is movable to an infinite number of positions between the open position and the closed position.

25. The method of claim 17, wherein the controller is configured to detect when a plug in the tube has occurred by an increase in air pressure in the tube.

* * * * *

UNITED STATES PATENT AND TRADEMARK OFFICE
CERTIFICATE OF CORRECTION

| | | |
|---|---|---|
| PATENT NO. | : 12,225,857 B2 | Page 1 of 1 |
| APPLICATION NO. | : 18/494474 | |
| DATED | : February 18, 2025 | |
| INVENTOR(S) | : Matthew Koch et al. | |

It is certified that error appears in the above-identified patent and that said Letters Patent is hereby corrected as shown below:

In the Claims

Column 35, Lines 51-53 Claim 2 should read as follows:
2. The system of claim 1, wherein the pressure relief valve is movable to an infinite number of positions between the open position and the closed position.

Signed and Sealed this
Twenty-second Day of April, 2025

Coke Morgan Stewart
*Acting Director of the United States Patent and Trademark Office*